US012042771B2

(12) United States Patent
Yoo et al.

(10) Patent No.: US 12,042,771 B2
(45) Date of Patent: Jul. 23, 2024

(54) NANOBUBBLE GENERATION SYSTEM USING FRICTION

(71) Applicants: Young Ho Yoo, Seoul (KR); FAWOO NANOTECH CO., LTD., Gyeonggi-do (KR)

(72) Inventors: Young Ho Yoo, Seoul (KR); Tae Geun Yoo, Seoul (KR); A Ram Yoo, Seoul (KR)

(73) Assignee: FAWOO NANOTECH CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/767,370

(22) PCT Filed: Jul. 30, 2020

(86) PCT No.: PCT/KR2020/010033

§ 371 (c)(1),
(2) Date: Apr. 7, 2022

(87) PCT Pub. No.: WO2021/071072

PCT Pub. Date: Apr. 15, 2021

(65) Prior Publication Data

US 2022/0323916 A1 Oct. 13, 2022

(30) Foreign Application Priority Data

Oct. 11, 2019 (KR) ........................ 10-2019-0126340

(51) Int. Cl.
*B01F 27/11* (2022.01)
*B01F 23/231* (2022.01)
(Continued)

(52) U.S. Cl.
CPC .................. *B01F 23/23121* (2022.01); *B01F 23/231121* (2022.01); *B01F 25/41* (2022.01); *B01F 27/1131* (2022.01); *B01F 27/118* (2022.01)

(58) Field of Classification Search
CPC ...... B01F 27/05; B01F 27/118; B01F 27/1131
See application file for complete search history.

(56) References Cited

U.S. PATENT DOCUMENTS

2017/0027138 A1 2/2017 Kim

FOREIGN PATENT DOCUMENTS

DE 3213283 A1 11/1982
JP 2009039600 A 2/2009
(Continued)

OTHER PUBLICATIONS

International Search Report dated Nov. 13, 2020 in connection with PCT/KR2020/010033.

(Continued)

*Primary Examiner* — Robert A Hopkins
(74) *Attorney, Agent, or Firm* — Quarles & Brady LLP; Yakov S. Sidorin

(57) ABSTRACT

The present disclosure relates to a nanobubble generation system using friction in which a frictional force is applied to bubbles included in a gas-liquid mixed fluid so that the atomization of the bubbles is induced and nanobubbles are generated. The nanobubble generation system includes: a chamber including an inlet, an outlet, and an internal space S configured to atomize bubbles included in a gas-liquid mixed fluid; one or more strikers each including a plurality of protrusions provided on a body thereof to simultaneously apply impact to the gas-liquid mixed fluid that flows into the chamber and swirl the fluid in order to cause the gas-liquid mixed fluid to rub against an inner wall of the chamber, the strikers being provided on the driving shaft; a plurality of friction elements provided on the driving shaft in order to apply frictional force to the gas-liquid mixed fluid; and a driving mechanism including the driving shaft and configured to rotate the striker and the friction elements, wherein
(Continued)

1A(1B) 32 34 17 10(10S) 30 14b 14a 10(10L) A 10(10S) 14b 24 35 21 20 33 31 41 S M 40 the friction elements are arranged on the driving shaft to be spaced apart from each other at a predetermined interval, and peripheral surfaces of bodies of the friction elements directly face the inner wall of the chamber with a predetermined distance therebetween.

15 Claims, 31 Drawing Sheets

(51) Int. Cl.
*B01F 25/41* (2022.01)
*B01F 27/1131* (2022.01)
*B01F 27/118* (2022.01)

(56) References Cited

FOREIGN PATENT DOCUMENTS

| | | | |
|---|---|---|---|
| JP | 2009142442 | A | 7/2009 |
| JP | 2015080771 | A | 4/2015 |
| JP | 2015188857 | A | 11/2015 |
| JP | 2018516753 | A | 6/2018 |
| JP | 6490317 | B1 | 3/2019 |
| KR | 20100013032 | U | 12/2010 |
| KR | 101015477 | B1 | 2/2011 |
| KR | 101270696 | B1 | 5/2013 |
| KR | 101594086 | B1 | 4/2016 |
| KR | 1020170049322 | A | 11/2017 |
| KR | 101866146 | B1 | 6/2018 |
| KR | 1020180071617 | A | 6/2018 |
| KR | 1020180087656 | A | 8/2018 |
| KR | 101969772 | B1 | 1/2019 |
| KR | 101947084 | B1 * | 2/2019 |
| KR | 101980480 | B1 | 5/2019 |
| KR | 1020190102811 | A | 9/2019 |
| WO | 2010002164 | A2 | 1/2010 |

OTHER PUBLICATIONS

Japan Patent Office, Notice of Reasons for Refusal, Application No. 2022-521595, dated Mar. 31, 2023, 6 pages.

European Patent Office, Extended European Search Report, Application No. 20873581.1, Oct. 6, 2023, 9 pages.

IP Australia, Examination Report, Application No. 2020361984, Aug. 21, 2023, 5 pages.

* cited by examiner (a)

(b)

NANOBUBBLE GENERATION SYSTEM USING FRICTION

CROSS-REFERENCE TO RELATED APPLICATIONS

This application is a US national phase of the pending International Application No. PCT/KR2020/010033 filed on Jul. 30, 2020 and now published as WO 2021/071072, which designates the United States and claims priority from Korean Application No. 10-2019-0126340 filed on Oct. 11, 2019. The disclosure of each of these patent applications is incorporated by reference herein.

TECHNICAL FIELD

The present disclosure relates to a nanobubble generation system using friction in which, by applying a frictional force to bubbles included in a gas-liquid mixed fluid, the atomization of the bubbles is induced and nanobubbles are generated.

BACKGROUND ART

In general, depending on the sizes, microbubbles are classified according to their size into microbubbles having a diameter of 50 μm or less and nanobubbles having a diameter of several hundred nm or less.

Microbubbles are very fine bubbles of 50 μm or less, rise to the water surface at a very slow rate of 0.1 cm/sec, disappear within 2 to 3 minutes after being generated, and have a cloudy milky color in water.

Nanobubbles are ultrafine microbubbles generated by intensively atomizing microbubbles and having a very small size of several hundred nm or less. The nanobubbles have various characteristics different from normal bubbles and microbubbles, and are transparent, so it is impossible to identify them with the naked eye in a general environment even if the microbubbles are floating in water.

Microbubbles in water are temporarily maintained in a stable state and then disappear as described above, whereas nanobubbles may be stably maintained for a long period of time up to several tens of days or more since the peripheries thereof are thickly surrounded by concentrated ion flows.

These nanobubbles generate various energy when they are extinguished and are used in various fields throughout the industry, i.e., for various aquaculture and hydroponics in the fishing and agriculture fields, for precision diagnosis and physical therapy in the medical field, high-purity water purification/refining treatment of wastewater and waste oil, sterilization, disinfection, deodorization, cleaning, and the like in the living field.

For example, in the case of water treatment, it is possible to shorten the treatment time for enhancing water quality by effectively injecting air into the water, and in the case of wastewater or waste oil treatment, it is possible to effectively remove various odor substances contained in the wastewater or waste oil, for example, by effectively injecting a strong oxidizing gas such as ozone.

Conventional techniques for atomizing bubbles usually use the principle of splitting bubbles while applying a shear force to a flowing gas-liquid mixed fluid, and are configured to use a boundary layer effect, turbulence and cavitation phenomena of fluid, and the like. With these techniques, only microbubbles are mainly generated, and the generation of nanobubbles is very insignificant. Thus, these techniques have not reached the level of practical use.

Korean Patent No. 10-1969772 (issued on Apr. 17, 2019) (hereinafter, referred to as "Prior Art 1"), which is one of the conventional techniques, discloses a configuration in which guide blades disposed at an inlet and outlet of a mixing part (chamber) to guide the flow of fluid, and rotors and stators having a meshing structure are continuously stacked in a housing around a motor shaft, wherein, by the relative rotation of the rotors with respect to the stators, the gears formed to correspond with each other on the stators and the rotors repeatedly strike the fluid, and the turbulence and cavitation pressures of the fluid are increased to apply a shear force to the bubbles, thereby creating microbubbles.

In Prior Art 1 having the above-described configuration, most of bubbles are generated only as microbubbles, so the quality of atomization of generated bubbles is poor and the generated bubbles disappear in a short time. By adopting a structure that forcibly diverts fluid in a zigzag form such that the flow passes through mesh gaps, there are problems in that a flow drag coefficient becomes large, power consumption is large, and productivity is not ensured because the processing flow rate is insufficient.

In addition, since the pressure in the chamber is maintained at a high pressure and it is necessary to provide a large number of rotors and stators having a complex structure, there are problems in that enormous power is wasted in order to operate the rotors and stators and the burden of operating costs is increased.

As another conventional technique different from Prior Art 1, Japanese Patent Laid-Open Publication No. 2009-142442 (issued on Jul. 2, 2009) (hereinafter, referred to as "Prior Art 2") has a structure in which a plurality of rotating disks provided with shearing edges are arranged on a rotating shaft installed in a chamber.

In Prior Art 2, since the rotating disks are rotated independently, rather than being relatively rotated, there are advantages of increasing the ejecting amount of fluid by causing free flow and remarkably reducing power and operating costs. However, by only including the rotating disks having a main function of applying a shear force, there are disadvantages in that only microbubbles are generated, and the bubble generation efficiency is poor.

As described above, the microbubble generation techniques up to now are limited to microbubble generation, and nanobubbles are not practically used in the industrial field despite the excellent utility thereof.

DISCLOSURE OF INVENTION

Technical Problem

The present disclosure has been made to solve the above problems.

In view of the foregoing, the present disclosure provides a nanobubble generation system using friction in which, by applying a frictional force to bubbles included in a gas-liquid mixed fluid, the atomization of the bubbles is induced and nanobubbles are generated.

In addition, the present disclosure provides a nanobubble generation system using friction in which nanobubbles are efficiently generated by generating the nanobubbles by using the principle of bubble atomization according to friction after atomizing bubbles contained in a gas-liquid mixed fluid in advance to a microbubble level.

In addition, the present disclosure provides a nanobubble generation system using friction, in which a wider effective friction surface is provided in a fluid flowing process, so that the atomization quality of nanobubbles due to friction and the efficiency of machine are significantly improved.

Furthermore, the present disclosure provides a nanobubble generation system using friction in which nanobubbles are produced in a qualitatively and quantitatively favorable manner so that nanobubbles which are excellent in utility can also be easily used in an industrial field that requires a large amount of nanobubbles.

Solution to Problem

In view of the foregoing, a nanobubble generation system using friction according to an embodiment of the present disclosure includes:

a chamber including an inlet, an outlet, and an internal space configured to atomize bubbles included in a gas-liquid mixed fluid, the chamber being provided with a driving shaft;

at least one striker including a plurality of protrusions provided on a body thereof to simultaneously apply impact to the gas-liquid mixed fluid that flows into the chamber and swirl the fluid in order to cause the gas-liquid mixed fluid to rub against an inner wall of the chamber, the striker being provided on the driving shaft;

a plurality of friction elements provided on the driving shaft in order to apply frictional force to the gas-liquid mixed fluid; and a driving mechanism including the driving shaft and configured to rotate the striker and the friction elements, wherein the friction elements are arranged on the driving shaft to be spaced apart from each other at a predetermined interval, the peripheral surfaces of bodies of the friction elements directly face the inner wall of the chamber with a predetermined distance therebetween, at least one of the friction elements has a line speed of 8 m/sec or more at a tip end of the body thereof in a direction orthogonal to the axis thereof, and the at least one striker and at least one of the plurality of friction elements are provided with at least one of a distribution hole or a cut-out passage configured to guide a flow of the gas-liquid mixed fluid to a plane perpendicular to the axis thereof.

A nanobubble generation system using friction according to an embodiment of the present disclosure includes:

a chamber including an inlet, an outlet, and an internal space configured to atomize bubbles included in a gas-liquid mixed fluid, the chamber being provided with a driving shaft;

one or more strikers each including a plurality of protrusions provided on a body thereof to simultaneously apply impact to the gas-liquid mixed fluid that flows into the chamber and swirl the fluid in order to cause the gas-liquid mixed fluid to rub against an inner wall of the chamber, the strikers being provided on the driving shaft;

a plurality of friction elements provided on the driving shaft in order to apply frictional force to the gas-liquid mixed fluid; and a driving mechanism including the driving shaft and configured to rotate the striker and the friction elements, wherein the plurality of friction elements are arranged on the driving shaft to be spaced apart from each other at a predetermined interval, and peripheral surfaces of bodies of the friction elements directly face the inner wall of the chamber with a predetermined distance therebetween, and one or more small-diameter friction elements and one or more large-diameter friction elements having a relatively large radius compared to the small-diameter friction elements are arranged to be spaced apart from each other at a predetermined interval.

The driving shaft is sequentially provided with: a micro-atomization region in which the one or more strikers are arranged along the flow direction of the fluid in order to atomize the bubbles included in the gas-liquid mixed flowing into the chamber to a microbubble level in advance; and a nano-atomization region which is provided after the shearing edge in the fluid flow and in which one or more friction elements are arranged in order to ultra-atomize the bubbles, which are atomized into a micro-level, into nanobubbles.

One or more strikers may be provided in order to generate a strong centrifugal force in the nano-atomization region.

The micro-atomization region may be provided with a ring-shaped stator on the inner wall of the chamber to face the strikers, and the stator may be provided with a plurality of protrusion around a ring-shaped inner surface thereof.

A nanobubble generation system using friction according to an embodiment of the present disclosure includes:

one or more micro-level atomization apparatuses configured to apply an impact and a shear force to a gas-liquid fluid to atomize bubbles to a micro-level; and a nanobubble generation apparatus configured to apply a frictional force to the gas-liquid mixed fluid passing through the micro-level atomization apparatuses to atomize the bubbles into nanobubbles, wherein the nanobubble generation apparatus includes:

a first chamber includes an inlet and an outlet for the fluid and an inner wall that defines a space configured to accommodate the gas-liquid mixed fluid and apply a frictional force to the fluid;

one or more friction elements provided in the first chamber to be rotatable by using a driving shaft and configured to function as a friction mechanism for the fluid that generate a centrifugal force to push the fluid to the inner wall; and a first driving mechanism including the driving shaft in order to rotate the friction elements, and wherein the micro-level atomization apparatus includes:

a second chamber including an inlet, an outlet, and an internal space configured to atomize the bubbles included in the gas-liquid mixed fluid, the second chamber being provided with a driving shaft;

one or more strikers or impellers provided on the driving shaft and each including a plurality of protrusions configured to apply an impact to the fluid; and a second driving mechanism including the driving shaft and configured to drive the strikers or the impellers.

At least one of the friction elements and the strikers may be provided with at least one of a distribution hole and a cut-out passage configured to guide a flow of the gas-liquid mixed fluid to a plane perpendicular to the axis thereof.

At least one of the friction elements may have a line speed of 8 m/sec or more at a tip end of the body thereof in a direction orthogonal to the axis thereof.

The distance between a tip and of a surface of at least one of the friction elements orthogonal to the axis thereof and the inner wall of the chamber in which the friction elements are provided may be set to ½ or less of the radius of the friction element in order to apply the frictional force to the gas-liquid mixed fluid by using the inner wall of the chamber.

At least one of the friction elements and the strikers may be provided with at least one concave stage on at least one of both surfaces of the body orthogonal to the axis of thereof.

At least one of the friction elements and the strikers may have fine irregularities formed on at least a portion of the surface of the body.

The friction elements or strikers may be a multi-friction element or a multi-striker which two or more friction elements or strikers are configured as a single body via a connecting portion.

At least one of the friction elements may be an impeller-type friction element including a plurality of vanes.

At least one of the strikers may be provided with the protrusions on at least one of a peripheral surface of a disk-shaped body and both surfaces orthogonal to the axis.

At least one of the strikers may be provided with at least one concave stage and a plurality of distribution holes on at least one of both surfaces of a disk-shaped body orthogonal to the axis of thereof, and the plurality of protrusions may be provided on at least one of the outer periphery of the body and the inner or outer periphery of the concave end.

In at least one of the strikers, the protrusions may be configured as vane-shaped protrusions.

In the nanobubble generation apparatus, the friction elements may be arranged on the driving shaft to be spaced apart from each other at a predetermined interval, wherein one or more small-diameter friction elements and one or more large-diameter friction elements having a relatively large radius compared to the small diameter friction elements are mixed and arranged to be spaced apart from each other at a predetermined interval.

At least one of the strikers of the micro-level atomization apparatus may be provided on the driving shaft of the nanobubble generation system together with the one or more friction elements.

The friction element provided in the first chamber of the nanobubble generation apparatus may be a cylindrical friction element having a cylindrical shape.

The cylindrical friction element may include one or more concave stages or one or more convex stages formed on the peripheral surface thereof in order to increase the friction area and induce a swirling flow of the gas-liquid mixed fluid.

In the micro-level atomization apparatus, at least one of the strikers may be provided with a plurality of protrusions on at least the periphery of the body thereof, and the second chamber may be provided with a plurality of protrusions directly or indirectly on at least a portion of an inner wall thereof.

The micro-level atomization apparatus may be provided with the impeller on the driving shaft, an inlet of the impeller may be connected to the inlet of the chamber via an inlet pipe, and the micro-level atomization apparatus may be a pump-type micro-level atomization apparatus in which protrusions are radially formed on the inner wall of the second chamber.

Between the impeller of the pump-type micro-stage atomization apparatus and the inner wall of the second chamber, volute-type duct configured to collect and guide the gas-liquid mixed fluid to the inner wall of the second chamber may be provided.

A nanobubble generation system using friction according to an embodiment of the present disclosure includes:

a chamber including an inlet, an outlet, and an internal space configured to atomize bubbles included in a gas-liquid mixed fluid, the chamber being provided with a driving shaft;

one or more striking/friction elements each including a plurality of protrusions configured to apply impact to the gas-liquid mixed fluid introduced into the chamber and swirl the fluid, and a friction portion configured to apply a frictional force to the fluid, the striking/friction elements being provided on the driving shaft; and a driving mechanism including the driving shaft and configured to rotate the striking/friction elements, wherein the striking/friction elements are arranged on the driving shaft to be spaced apart from each other at a predetermined interval, and peripheral surfaces of bodies of the friction elements directly face the inner wall of the chamber with a predetermined distance therebetween.

At least one of the striking/friction elements may be provided with at least one of a distribution hole and a cut-out passage configured to guide a flow of the gas-liquid mixed fluid to a plane perpendicular to the axis thereof.

A plurality of striking/friction elements are arranged on the driving shaft to be spaced apart from each other at a predetermined interval, wherein the protruding sizes of the protrusions may be relatively gradually decreased according to an arrangement order thereof in the fluid flowing direction in order to sequentially atomize the bubbles included in the gas-liquid mixed fluid from a microbubble level to a nanobubble level.

At least one of the striking/friction elements may be provided with the protrusions on at least one of a peripheral surface of a body and both surfaces orthogonal to the axis.

The chamber may be provided on the inner wall thereof with a spiral groove configured to guide the gas-liquid mixed fluid.

The chamber may be provided with a funnel portion at the outlet side, and the outlet may be provided next to the funnel portion on an extension line of a center line of the driving shaft provided in the chamber.

Fine irregularities may be formed on at least a portion of the inner wall of the chamber.

At least one impeller may be additionally provided on the driving shaft adjacent to the inlet of the chamber.

Advantageous Effects of Invention

With the nanobubble generation system using friction and having the above-described configuration according to the present disclosure, it is possible to induce atomization of bubbles to generate nanobubbles by applying a frictional force to the bubbles included in a gas-liquid mixed fluid.

In addition, it is possible to generate nanobubbles markedly efficiently by generating the nanobubbles by using the principle of bubble atomization according to friction after atomizing bubbles contained in a gas-liquid mixed fluid in advance to a microbubble level.

Due to the organic configuration based the line speed of the friction element, the friction surface, and the proper distance between the friction element and the inner wall of the chamber, not only the friction element but also the inner wall of the chamber having a larger area functions as a friction surface, while the entire surface of the body of the friction element functions as an effective friction surface via the distribution holes and the like, the quality of bubble atomization, the amount of dissolved oxygen, and the nanobubble generation ability of the apparatus can be significantly improved compared to the existing techniques, and a large amount of nanobubbles can be generated.

Furthermore, since it becomes possible to generate nanobubbles in a qualitatively and quantitatively favorable manner, nanobubbles excellent in utility can be easily used, especially in industrial fields that require a large amount of nanobubbles.

BRIEF DESCRIPTION OF THE DRAWINGS

FIGS. 1A and 1B are views illustrating a principle of generating nanobubbles using friction, in which FIG. 1A is a view illustrating atomization according to flow friction of a fluid (bubbles), and FIG. 1B is a view illustrating atomization of a fluid (bubbles) according to rotating friction of a friction element.

FIGS. 3A and 3B are views illustrating the flow of the fluid in FIG. 2, in which FIG. 3A is an enlarged view of part A of FIG. 2, and FIG. 3B is a cross-sectional view taken along line B-B in FIG. 2.

BEST MODE FOR CARRYING OUT THE INVENTION

Hereinafter, embodiments of a nanobubble generation system using a frictional force according to the present disclosure will be described in more detail with reference to the accompanying drawings.

All objects generate heat when pressure accompanying speed is applied thereto. From the time point at which a speed and pressure reach critical points, a phenomenon in which a surface against which an object rubs is crushed with heat to reduce a frictional force occurs.

This phenomenon may easily be observed in the phenomenon in which, in the portion where a skate blade passes on ice, heat is generated, causing the ice to melt and be slippery.

Figure 1:
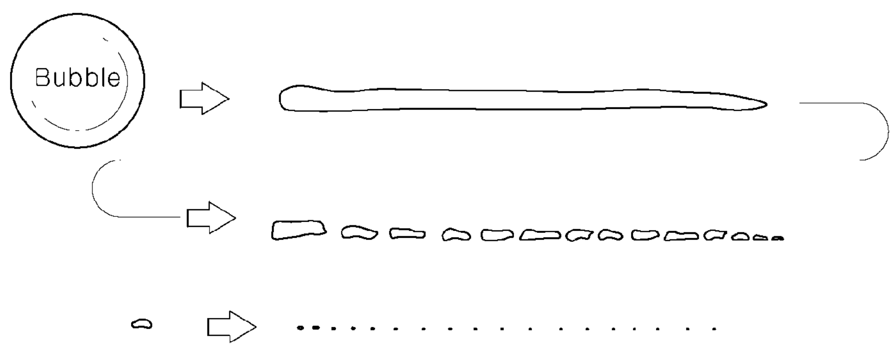
Figure 1:
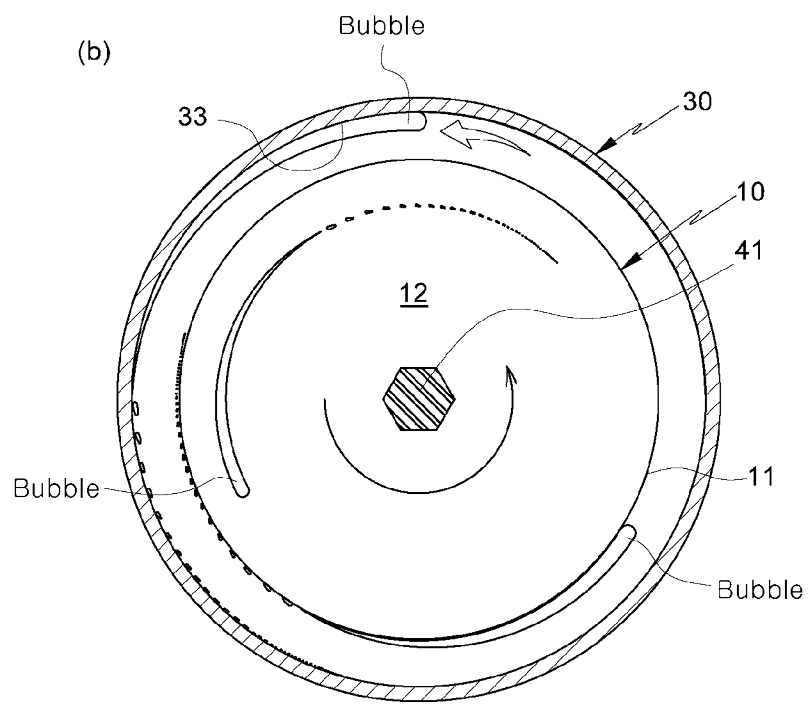

For example, when a frictional force is applied to a gas-liquid mixed fluid in which a gas such as oxygen is mixed with water, the bubbles included in the fluid are divided into small pieces after tensile deformation stretching the bubbles is generated, as illustrated in FIG. 1A. Each finely divided individual bubble is atomized over and over again and becomes extremely fine in nano size (hereinafter, referred to as "the principle of atomization of bubbles by friction").

The applicant of the present application has disclosed "Channel member for generating microbubbles using the principle of atomization of bubbles by friction" (Korean Patent No. 10-2100074) (hereinafter, referred to as "pre-registered technique").

The pre-registered technique is a technique capable of generating nanobubbles when a friction surface is densely formed on a tube-shaped flow path member and the friction length is several meters to several tens of meters long, wherein nanobubbles are generated by causing the gas-liquid mixed fluid to rub against the stationary friction surface while moving at a pressure and a velocity equal to or higher than critical points.

The pre-registered technique is safe for generating nanobubble on a small and medium scale, but when it is necessary to output a large amount, a large-capacity pressure pump should be used instead of a general pump, and it is difficult to create a dense friction surface to correspond to the increasing diameter of the tube.

In order to solve the above-described problems, as a reverse idea of the pre-registered technique, the applicant of the present application conceived a method in which the fluid is in a stationary state and the friction surface applying a frictional force to the fluid moves at high speed.

It was considered that, in generating nanobubbles, the following phenomenon may occur: if fine bubbles were generated in the gas-liquid mixed fluid even if the fine bubbles were not atomized up to the microbubble level, when a rotating frictional force is forcibly applied to the bubbles as illustrated in FIG. 1B, the bubbles included in the gas-liquid mixed fluid are tensioned and deformed in a circular arc shape along the rotating friction surface and finely divided, leading to an ultra-fine state.

The present disclosure applies the above-described rotating frictional force to the above-described principle of atomization of bubbles and generating nanobubbles using friction.

Figure 2:
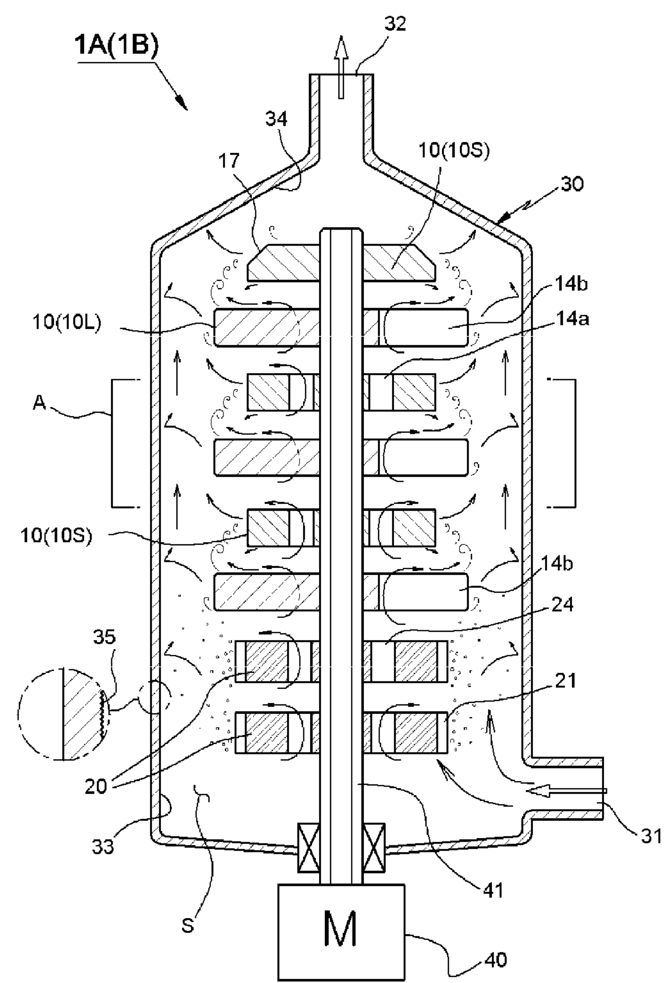
FIG. 2 is a vertical cross-sectional view schematically illustrating the configuration of an embodiment of the present disclosure.
Figure 3:
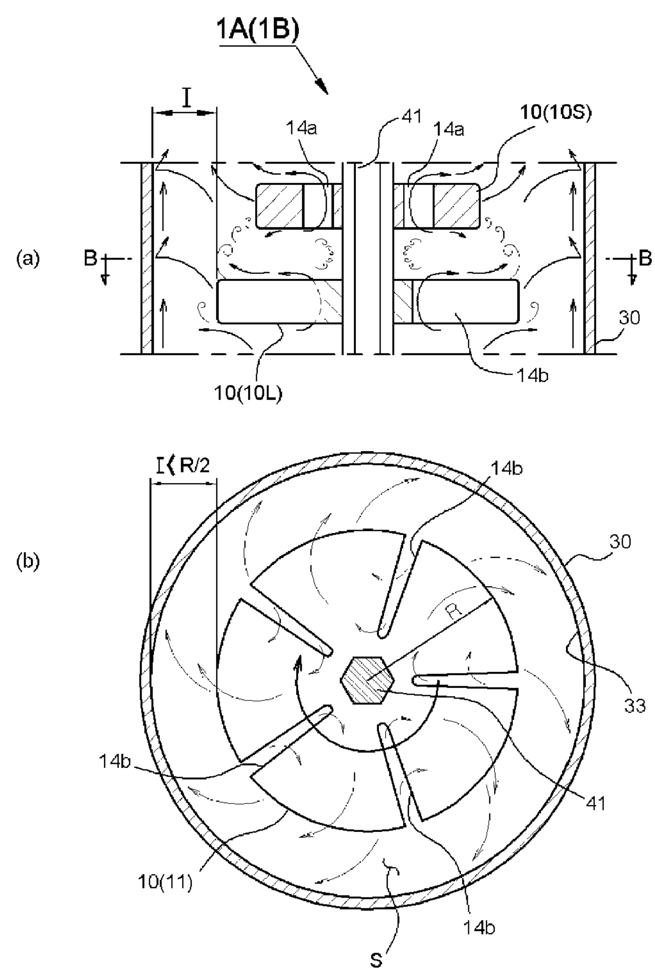

As illustrated in FIGS. 2 and 3, a nanobubble generation system 1A using friction according to a first embodiment of the present disclosure includes: a chamber 30 including an inlet 31, an outlet 32, and an internal space S configured to atomize bubbles included in a gas-liquid mixed fluid, the chamber 30 being provided with a driving shaft 41; at least one striker 20 including a plurality of protrusions 21 provided on a body thereof to simultaneously apply impact to the gas-liquid mixed fluid that flows into the chamber 30 and swirl the fluid in order to cause the gas-liquid mixed fluid to rub against an inner wall 33 of the chamber, the striker being provided on the driving shaft 41; a plurality of friction elements 10 provided on the driving shaft 41 in order to apply a frictional force to the gas-liquid mixed fluid; and a driving mechanism 40 including the driving shaft 41 and configured to rotate the striker 20 and the friction elements 10.

The friction elements 10 are arranged on the driving shaft 41 to be spaced apart from each other at a predetermined interval such that, when the driving shaft rotates, the gas-liquid mixed fluid rubs against the peripheral surfaces and opposite surfaces of the bodies of the friction elements perpendicular to the axis thereof and rubs against the inner wall 33 of the chamber 30 so that the bubbles included in the gas-liquid fluid undergo tensile deformation and atomization, the peripheral surfaces 11 of the bodies of the friction elements directly face the inner wall 33 of the chamber with a predetermined distance therebetween, at least one of the friction elements 10 has a line speed of 8 m/sec or more at a tip end of the body thereof in a direction orthogonal to the axis thereof, and the at least one striker 20 and at least one of the plurality of friction elements 10 are provided with at least one of a distribution hole 14*a* or 24*a* and a cut-out passage 14*b* configured to guide a flow of the gas-liquid mixed fluid to a plane perpendicular to the axis.

The gas-liquid mixed fluid may be variously made as a mixed water in which water and air are mixed, a mixed liquid in which a liquid other than water and air are mixed, a mixed liquid in which water, air, and an additional gas, such as oxygen ($O_2$), ozone ($O_3$), or hydrogen ($H_2$), are mixed, and a mixed oil in which an industrial oil and an additional gas, such as oxygen ($O_2$), ozone ($O_3$), or hydrogen ($H_2$) are mixed.

The gas-liquid mixed fluid may include tap water, groundwater, river water, fresh water, and the like containing bubbles generated in a water supply process.

As illustrated in FIGS. 5A and 5B, FIGS. 19A to 19C, and the like, when the strikers 20 rotates, the protrusions 21 arranged in a sawtooth shape or the like around the peripheries of the strikers apply an impact and a shear force to the bubbles included in the gas-liquid mixed fluid to atomize the bubbles to a micro size, and the friction elements 10 apply a frictional force to the bubbles atomized into the micro size by using the strikers, thereby causing the bubbles to undergo tensile deformation and to be atomized to an ultra-fine nano-size.

Figure 4:
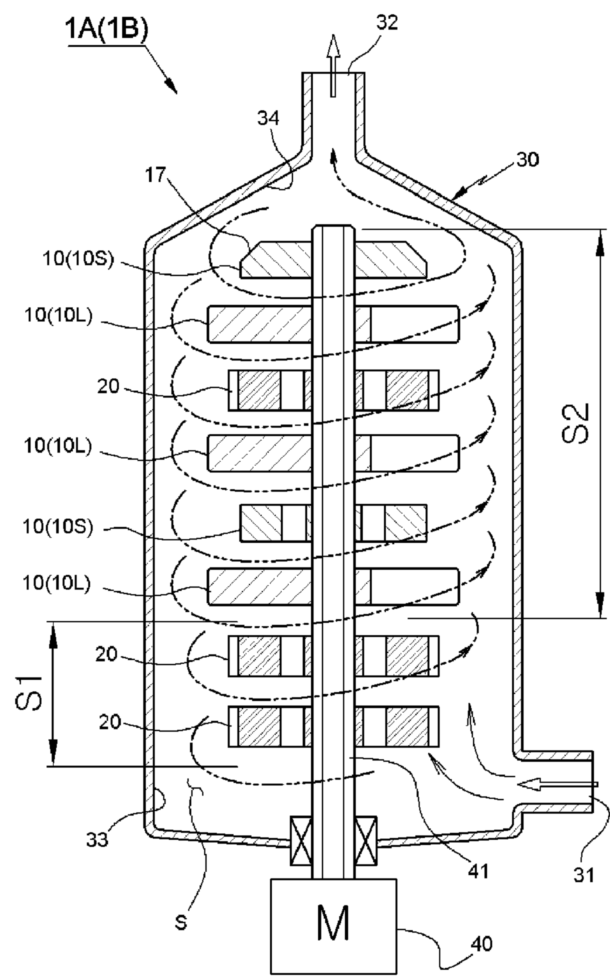
FIG. 4 is a vertical cross-sectional view illustrating the configuration of an embodiment of the present disclosure.

The rotation operation of the strikers 20 and the friction elements 10, particularly the rotation operation of the strikers 20, strongly push the fluid to the inner wall 33 of the chamber by a centrifugal force so that a frictional force is applied to the fluid by using the inner wall 33 of the chamber, and while the fluid passes through the spaces between the chamber inner wall 33 and the rotating body configured with the strikers 20 and the friction elements 10, a spirally flowing flow is generated (see FIG. 4).

Here, the centrifugal force acts in the chamber by the rotation of the strikers 20 and the friction elements 10 so that the flow is biased toward the inner wall 33 of the chamber. Thus, in particular, both surfaces 12 of each friction element 10 orthogonal to the axis may lose most of the fluid friction function thereof.

The plurality of friction elements 10 are arranged to be spaced apart from each other so that when the driving shaft rotates, a flow in which the fluid spirally flows is generated (see FIGS. 2 to 4), and, as illustrated in FIG. 1B, the bubbles included in the gas-liquid mixed fluid undergo tensile deformation in an arc shape on the peripheral surface 11 and the both surfaces 12 of each friction element 10 perpendicular to the axis, in particular, on the wide inner surface 33 of the first chamber 30A to be finely divided and intensively atomized so that nanobubbles are generated.

At this time, as necessary conditions for generating nanobubbles, a sufficient friction surface, a line speed of the friction elements 10 for inducing a flow rate, and an appropriate distance between the friction elements 10 and the inner wall 33 of the first chamber should be organically satisfied.

In addition, the distribution holes 14*a* or the cut-out passages 14*b* formed in each friction element 10 may prevent the flow on which a centrifugal force acts from being biased toward the inner wall 33 of the chamber and may enable the both surfaces 12 of each friction element 10 that are orthogonal to the axis, to function as friction surfaces (see FIGS. 2 to 4 and FIGS. 10A to 12C).

More specifically, the distribution holes 14*a* or the cut-out passages 14*b* formed in the friction elements 10 function as passages that allow the fluid to pass through the body of each friction element 10 and flow on both surfaces 12 orthogonal to the axis thereof in each body, whereby the distribution holes 14*a* or the cut-out passages 14*b* are capable of contributing to the expansion of an effective friction area of each friction element so that the fluid friction function can be performed even in an area close to the driving shaft 41 on both surfaces 12 orthogonal to the axis of the friction element.

In addition, since the distribution holes 14*a* or the cut-out passages 14*b* are formed in the friction elements 10, it is possible to amplify and accelerate the helical swirling flow of the fluid, thereby increasing the frictional force that affects the atomization of bubbles.

Accordingly, the distribution holes 14*a* and the cut-out passages 14*b* formed in the friction elements 10 are preferably formed as large as possible at a position adjacent to the shaft holes 13 of the friction elements 10, but are not limited thereto (see FIGS. 10A and 10B, etc.).

The cut-out passages 14*b* may be formed inward from the peripheral ends of the basic body (see FIG. 12A) having a disk shape, and may be formed to be directed to the center of the body (see FIGS. 11A and 12B). However, without being limited thereto, the cut-out passages 14*b* may be formed in various ways, such as being inclined with respect to the radial direction.

The friction element 10 may be formed in a vane shape in which regions divided by the cut-out passages 14*b* are bent at an arbitrary angle (see FIG. 12C). The friction element having this configuration has a friction function against the fluid, and is capable of accelerating or suppressing the flow rate depending on the arrangement direction together and suppressing the friction of the fluid from being biased to the inner wall of the chamber.

As illustrated in FIGS. 2 and 5B, a nanobubble generation system 1B using friction according to a second embodiment of the present disclosure includes: a chamber 30 including an inlet 31, an outlet 32, and an internal space S configured to atomize bubbles included in a gas-liquid mixed fluid, the chamber 30 being provided with a driving shaft 41; at least one striker 20 including a plurality of protrusions 21 provided on a body thereof to apply an impact to the gas-liquid mixed fluid that flows into the chamber 30 and swirl the fluid in order to cause the gas-liquid mixed fluid to rub against an inner wall of the chamber 30, the striker being provided on the driving shaft 41; a plurality of friction elements 10 provided on the driving shaft 41 in order to apply a frictional force to the gas-liquid mixed fluid; and a driving mechanism 40 including the driving shaft 41 and configured to rotate the striker 20 and the friction elements 10, wherein the plurality of friction elements 20 are arranged on the driving shaft to be spaced apart from each other at a predetermined interval such that, when the driving shaft rotates, the gas-liquid mixed fluid rubs against the peripheral surfaces and opposite surfaces of the bodies of the friction elements perpendicular to the axis thereof and rubs against the inner wall of the chamber so that the bubbles included in the gas-liquid fluid undergo tensile deformation and atomization, the peripheral surfaces 11 of the bodies of the friction elements directly face the inner wall 33 of the chamber with a predetermined distance therebetween, and at least one small-diameter friction element 10S and at least one large-diameter friction element 10L having a relatively large radius compared to the small-diameter friction element 10S are arranged to be spaced apart from each other at a predetermined interval.

Preferably, the small-diameter friction element 10S is disposed first in the fluid flow on the driving shaft, but the present disclosure is not limited thereto.

The small-diameter friction elements 10S and the large-diameter friction elements 10L may be alternately arranged.

In the nanobubble generation system 1B using friction of the second embodiment, in configuring and arranging the friction elements 10, the small-diameter friction elements 10S and the large-diameter friction elements 10L are arranged to be spaced apart from each other at a predetermined interval, whereby, within a limited chamber space, it is possible to increase the spacing between the large-diameter friction elements 10L and to locate the small-diameter friction element 10S in the spacing, so that the friction space and friction area for the fluid can be effectively used.

In addition, when only the friction elements 10 having the same radius are continuously arranged and the spacing between adjacent friction elements is not large, the fluid flow is biased toward the inner wall 33 of the chamber by a centrifugal force as described above, and thus the both surfaces 12 of each friction element that are orthogonal to the axis thereof lose most of the utility thereof. However, when the friction elements are arranged to be jagged due to the radial differences, the entire surfaces of the bodies of the friction elements 10 are capable of functioning as an effective friction surface even if the spacing between the friction elements 10 is not relatively large (see FIGS. 2 to 4, etc.).

Meanwhile, when the gas-liquid mixed fluid is atomized by applying a frictional force from the beginning without a microbubble atomization step, the efficiency of the apparatus and the atomized quality of bubbles are deteriorated.

Therefore, as illustrated in FIGS. 4 and 5B, the driving shaft 41 of the first embodiment 1A and the second embodiment 1B may be sequentially provided with: a micro-atomization region S1 in which the one or more strikers 20 are arranged along the flow direction of the fluid in order to atomize the bubbles included in the gas-liquid mixed flowing into the chamber 30 to a microbubble level in advance; and a nano-atomization region S2 which is provided after the micro-atomization region S1 in the fluid flow and in which one or more friction elements 10 are arranged in order to ultra-atomize the atomized bubbles into nanobubbles.

One or more strikers 20 may be provided in the nano-atomization region S2 to generate a strong centrifugal force (see FIG. 4 etc.).

Figure 5:
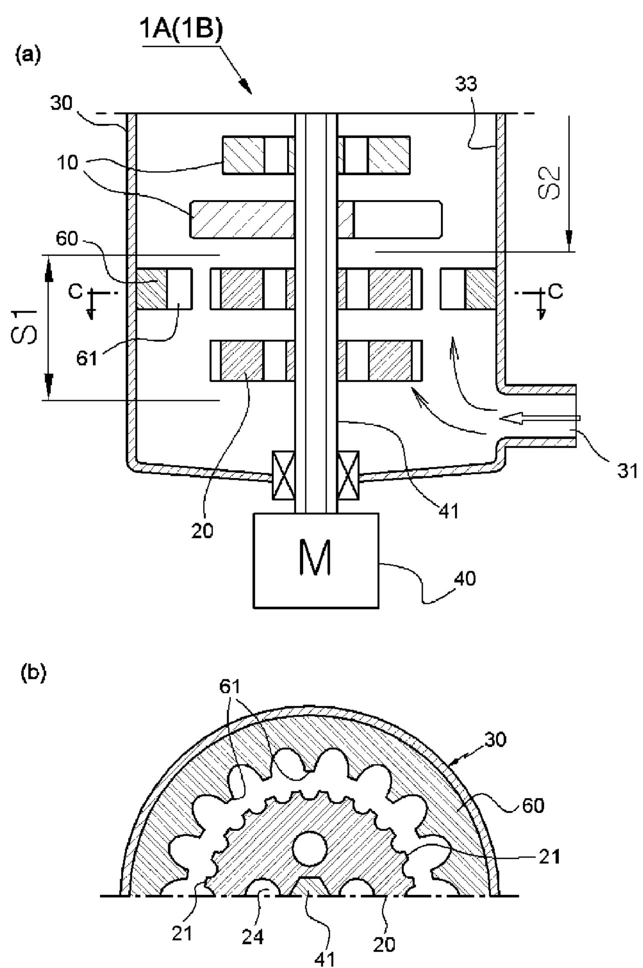
FIG. 5A is a partially omitted cross-sectional view illustrating the configuration of an embodiment of the present disclosure.
FIG. 5B is a partially omitted cross-sectional view taken along line C-C in FIG. 5A.

In addition, as illustrated in FIG. 5, a ring-shaped stator 60 installed on the inner wall of the chamber to face the striker 20 is provided in the micro-atomization region S1, and the stator 60 may be provided with a plurality of protrusions 61 around the ring-shaped inner surface thereof.

The micro-atomization region S1 is preferably formed in a short section of ⅓ or less of the nano-atomization region S2, but is not limited thereto.

As the number of strikers 20 increases, the helically swirling flow of the fluid becomes stronger, and accordingly, the flow resistance increases and the ejection amount decreases.

According to the above-described configuration, the gas-liquid mixed fluid introduced through the inlet 31 of the chamber at a predetermined set flow rate is atomized to a microbubble level in advance by an impact and a shear force applied thereto by the strikers 20 in the micro-atomization region S1 including the strikers 20 and the inner wall 33 of the chamber adjacent to the same, and in the subsequent helical swirling flow, tensile deformation and ultra-atomization by friction are strengthened step by step in the nano-atomization region S2 including the friction element 10 and the inner wall 33 of the chamber adjacent to the same, so that nanobubbles can be effectively generated.

Meanwhile, as described above, when the micro-atomization region S1 and the nano-atomization region S2 are driven by using a single driving mechanism in a single chamber and the scales of the regions are increased, there is a problem in that the driving mechanism is overloaded.

Figure 6:
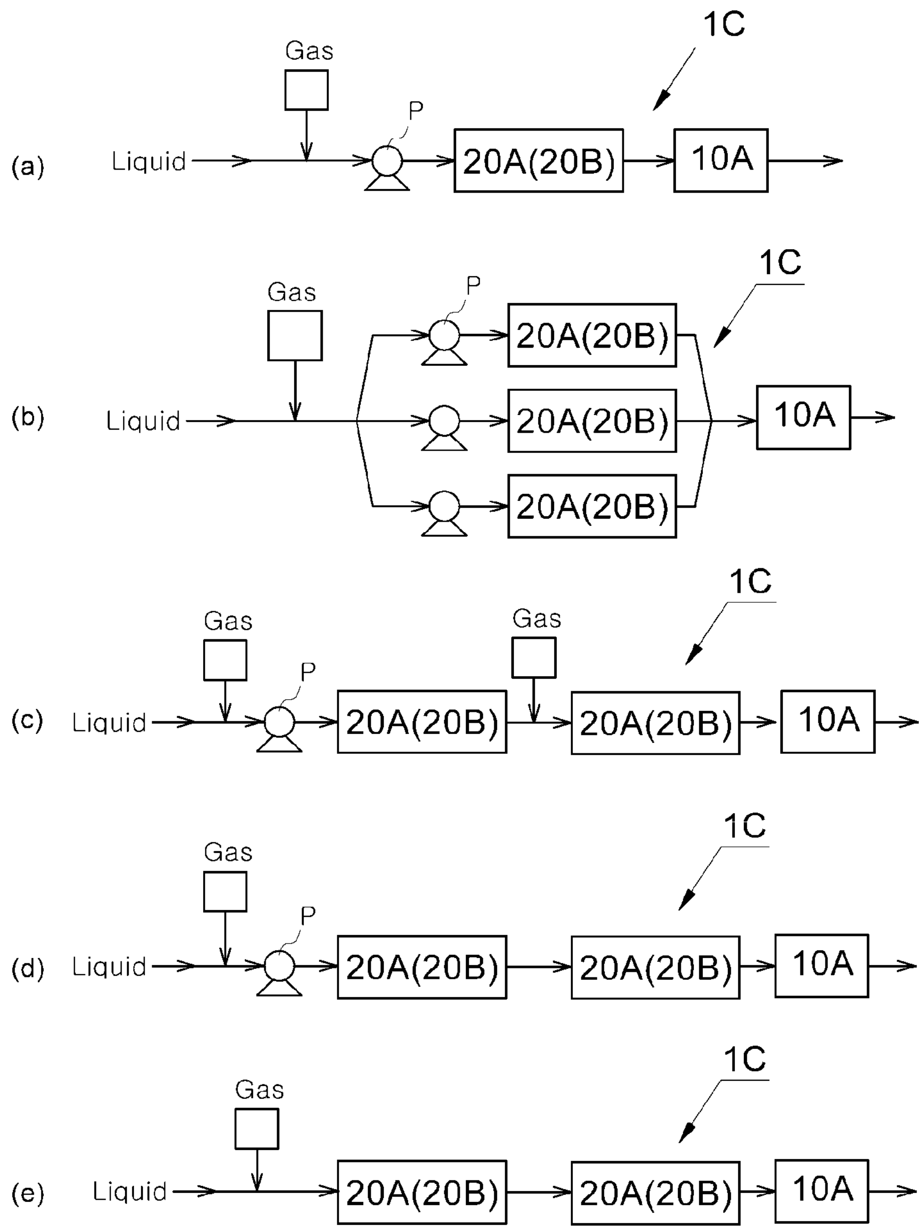
FIGS. 6A to 6E are views schematically illustrating arrangement configurations of embodiments of the present disclosure.
Figure 7:
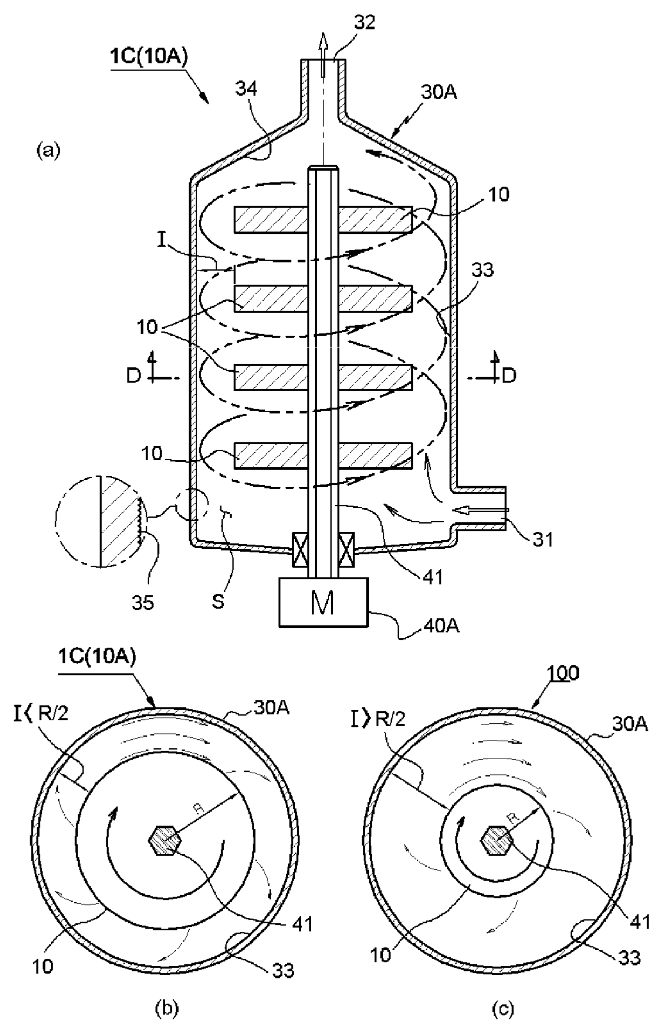
FIG. 7A is a vertical cross-sectional view of a nanobubble generation apparatus of an embodiment according to the present disclosure.
FIG. 7B is a cross-sectional view taken along line D-D in FIG. 7A.
FIG. 7C is a cross-sectional view of another configuration that is compared with FIG. 7B.

In consideration this point, in a nanobubble generation system 1C using friction according to a third embodiment, a micro-level atomization apparatus 20A (20B) using a striker 20 and a nanobubble generation apparatus 10A using a friction element 10 are separated into independent apparatuses that include separate chambers and driving mechanisms, respectively, to distribute the driving load, and the gas-liquid mixed fluid is introduced into the nanobubble generation apparatus 10A after first passing through the micro-level atomization apparatus 20A (20B) (see FIG. 6).

As illustrated in FIGS. 6 to 9, the nanobubble generation system 1C using friction according to the third embodiment includes one or more micro-level atomization apparatuses 20A (20B) that apply an impact and a shear force to the gas-liquid mixed fluid to atomize bubbles to a micro-level, and a nanobubble generation apparatus 10A that atomizes bubbles into nanobubbles by applying a frictional force to the gas-liquid mixed fluid passing through the micro-level atomization apparatus 20A.

As illustrated in FIGS. 7A to 7C, the nanobubble generation apparatus 10A includes: a first chamber 30A including an inner wall 33 defining a space S for accommodating the gas-liquid mixed fluid and configured to apply a frictional force to the fluid, an fluid inlet 31 and a fluid outlet 32; one or more friction elements 10 provided in the first chamber 30A to be rotatable by using the driving shaft 41 and configured to generate a centrifugal force to push the fluid to the inner wall and function as a friction mechanism for the fluid by itself; and a first driving mechanism 40A including the driving shaft 41 for rotating the friction element 10.

As illustrated in FIGS. 9A and 9B, the micro-level atomization apparatus 20A includes a second chamber 30B including an internal space S for atomizing the bubbles included in the gas-liquid mixed fluid, an inlet 31, and an outlet 32, the second chamber being provided with a driving shaft 41; one or more strikers 20 or impellers 20*f* provided on the driving shaft 41 and each provided with a plurality of protrusions 21 configured to apply an impact to the fluid; and a second driving mechanism 40B including the driving shaft 41 and configured to drive the strikers 20 or impellers 20*f*.

In the micro-level atomization apparatus 20A, when the strikers 20 rotate, the protrusions 21 arranged on the peripheries thereof in a sawtooth shape or the like apply an impact and a shear force to the bubbles included in the gas-liquid mixed fluid to atomize the bubbles to a micro-size in preparation of efficient generation of nanobubbles that is to be performed subsequently.

In the second embodiment (1B) and the third embodiment (1C), as in the case of the first embodiment (1A), at least one of the friction element 10 and the striker 20 may be provided with at least one of the distribution holes 14*a* (24*a*) and the cut-out passages 14*b* for guiding the flow of the gas-liquid mixed fluid to a plane perpendicular to the axis.

In the second embodiment (1B) and the third embodiment (1C), as in the first embodiment (1A), it is preferable for at least one of the friction elements 10 to have a linear speed of 8 m/sec or more at the tip-most end of the body thereof in the direction orthogonal to the axis thereof.

In addition, in the first embodiment (1A), the second embodiment (1B), and the third embodiment (1C), a distance I between a tip end of a surface of at least one of the friction elements 10 orthogonal to the axis thereof and the inner wall 33 of the chamber may be set to be equal to or less than ½ of the radius of the friction element in order to apply a frictional force to the gas-liquid mixed fluid by using the inner wall 33 of the chamber (see FIGS. 3A to and 7C).

The linear speed and the distance I are set based on that having the largest radius among the friction elements 10.

Figure 8:
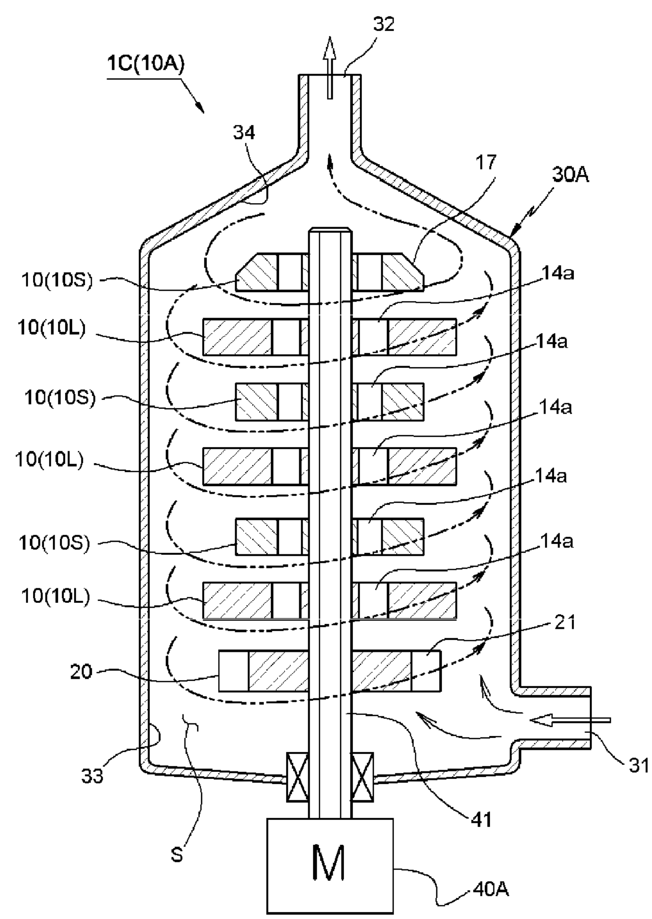
FIG. 8 is a vertical cross-sectional view of a nanobubble generation apparatus according to an embodiment of the present disclosure.
Figure 9:
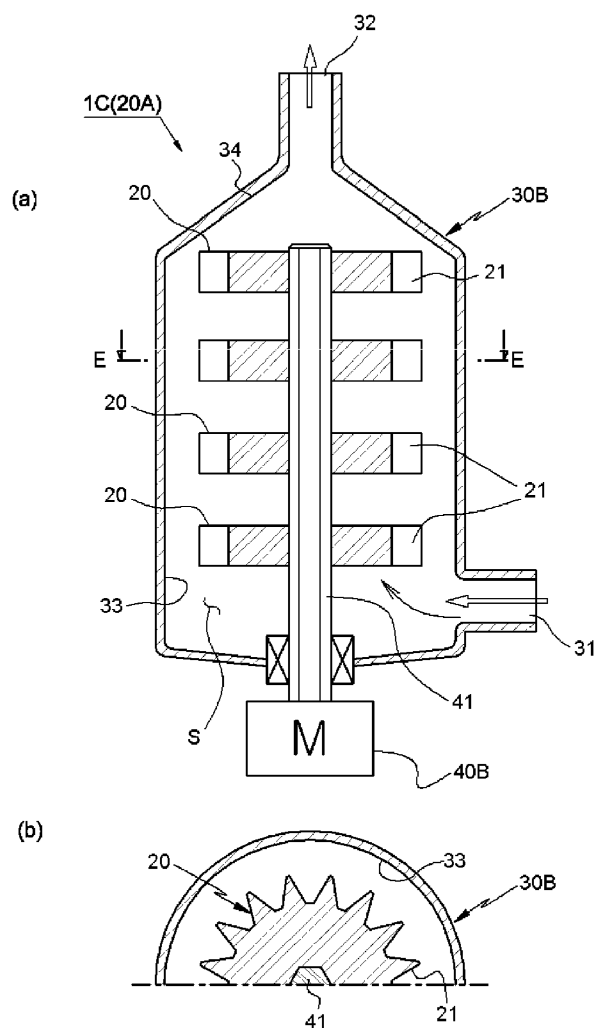
FIG. 9A is a vertical cross-sectional view of a micro-level atomization apparatus of an embodiment according to the present disclosure.
FIG. 9B is a partially omitted cross-sectional view taken along line E-E in FIG. 9A.
Figure 10:
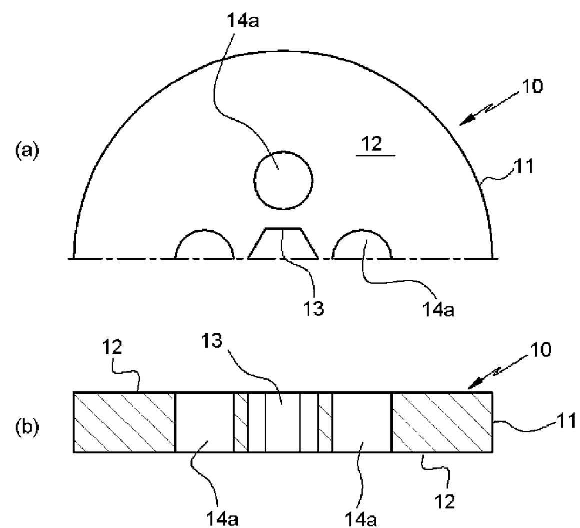
FIG. 10A is a partially omitted plan view of a friction element according to an embodiment of the present disclosure.
FIG. 10B is a vertical cross-sectional view of FIG. 10A.
Figure 11:
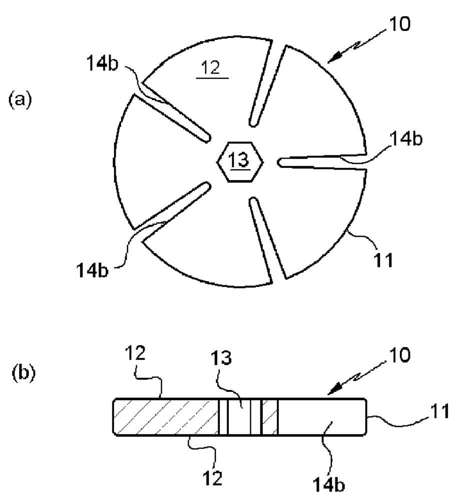
FIG. 11A is a plan view of a friction element according to an embodiment of the present disclosure.
FIG. 11B is a vertical cross-sectional view of FIG. 11A.
Figure 12:
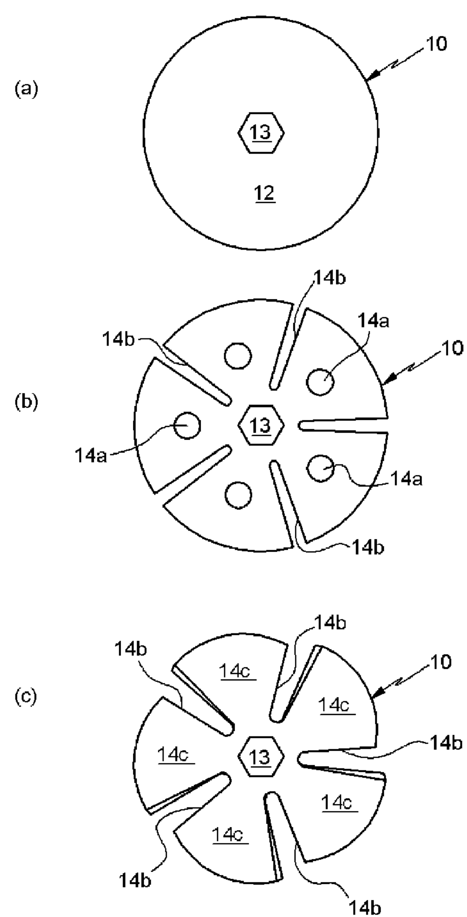
FIGS. 12A, 12B, and 12C are plan views of friction elements according to an embodiment of the present disclosure.

In addition, among the friction elements 10, the friction element disposed closest to the outlet 32 of the chamber may have an inclined surface 17 at the edge of the peripheral surface of the body thereof facing the outlet of the chamber (see FIGS. 2, 4 and 8).

As described above, the configuration in which the edge of the friction element 10 is formed in the inclined surface 17 toward the outlet delays the separation point of the fluid, thereby increasing frictional efficiency.

Figure 13:
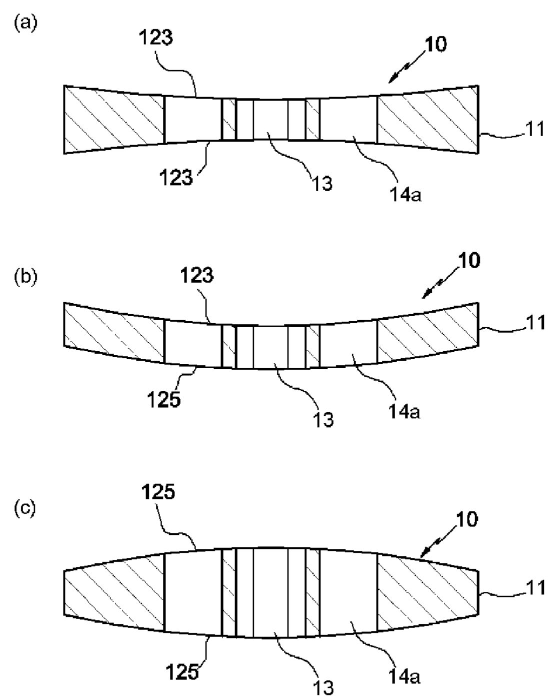
FIGS. 13A, 13B, and 13C are vertical cross-sectional views of friction elements according to an embodiment of the present disclosure.

In addition, in at least one of the plurality of friction elements 10, at least one surface in the direction orthogonal to the axis in a direction orthogonal to the axis may be formed in a concave surface 123 or a convex surface 125 to increase the friction area (see FIGS. 13A to 13C).

Figure 14:
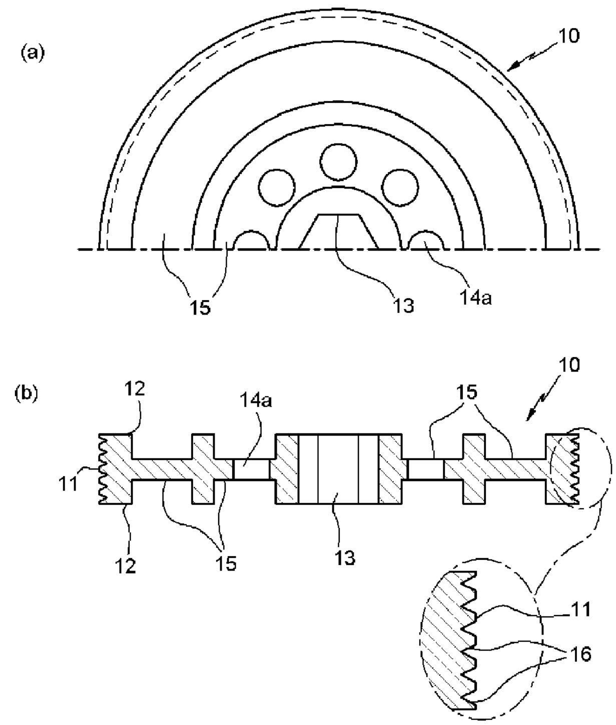
FIG. 14A is a partially omitted plan view of a friction element according to an embodiment of the present disclosure.
FIG. 14B is a vertical cross-sectional view of FIG. 14A.

In addition, at least one of the plurality of friction elements 10 may have an annular or spiral groove 16 formed on the peripheral surface 11 of a disk-shaped body (see FIGS. 14A and 14B).

The groove 16 formed in the peripheral surface 11 of the friction element may increase the friction area for the fluid.

In addition, at least one of the friction element 10 and the striker 20 may include one or more concave stages 15 formed on at least one of both surfaces 12 orthogonal to the axis of the body thereof in order to increase the friction area (see FIGS. 14A to 15B).

Figure 15:
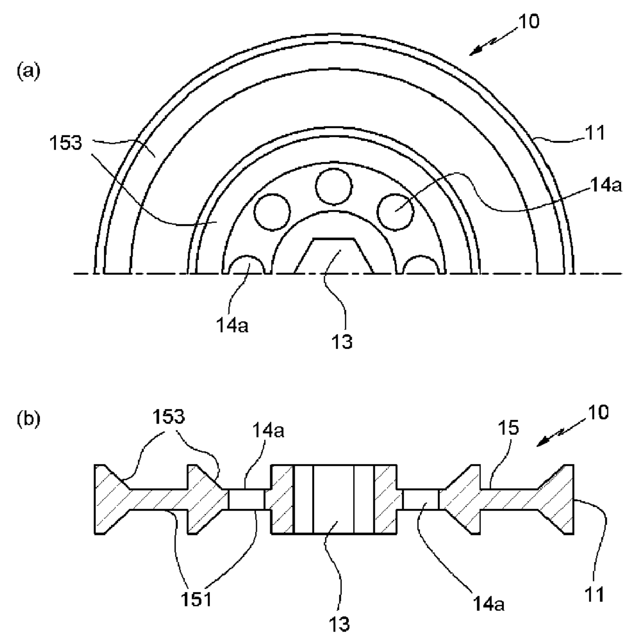
FIG. 15A is a partially omitted plan view of a friction element according to an embodiment of the present disclosure.
FIG. 15B is a vertical cross-sectional view of FIG. 15A.

The concave stage 15 may include one surface 151 orthogonal to the axial direction and two surfaces in the axial direction, and of the two surface in the axial direction, the surface located at the outer side may be formed as an inclined surface 153 that opens outward (see FIG. 15).

The concave stage 15 described above can increase the friction area of the friction element 10, and when the outer surface of the concave stage formed as an inclined surface 153 in a shape that opens outward, frictional flow according to the centrifugal force of the fluid may be smoothly performed despite the formation of the concave stage 15.

In addition, in at least one of the friction element 10 and the striker 20, fine irregularities may be formed on at least a portion of the surface of the body thereof in order to increase the friction area (not illustrated), wherein the fine irregularities may be formed through various methods such as surface roughening, sandblasting, and scratching.

Figure 16:
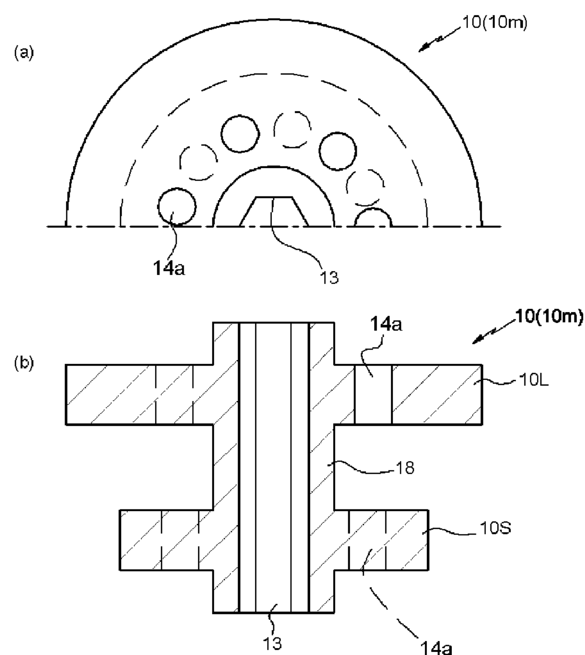
FIG. 16A is a partially omitted plan view of a multi-friction element according to an embodiment of the present disclosure.
FIG. 16B is a vertical cross-sectional view of FIG. 16A.
Figure 17:
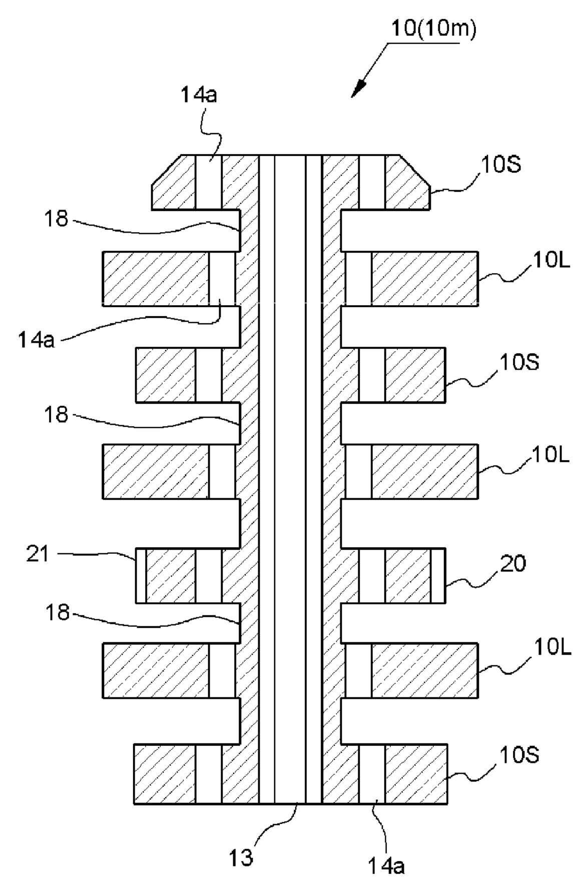
FIG. 17 is a vertical cross-sectional view of a multi-friction element according to an embodiment of the present disclosure.

In addition, the friction element 10 or the striker 20 may be formed as a multi-friction element 10*m* or a multi-striker in which two or more bodies are integrated as a single body via a connecting portion 18 (see FIGS. 16 and 17).

The multi-friction element 10*m* may be formed in two or more stages, of which the disk-shaped bodies are different in radius.

The multi-friction element 10*m* may be formed by connecting a pair of friction elements 10 arranged on the driving shaft 21 as a single body (see FIG. 17), and with this configuration, handling, management, and assembly can be easily performed.

In addition, the one or more friction elements 10 and the one or more strikers 20 may be formed as a single body (not illustrated).

Figure 18:
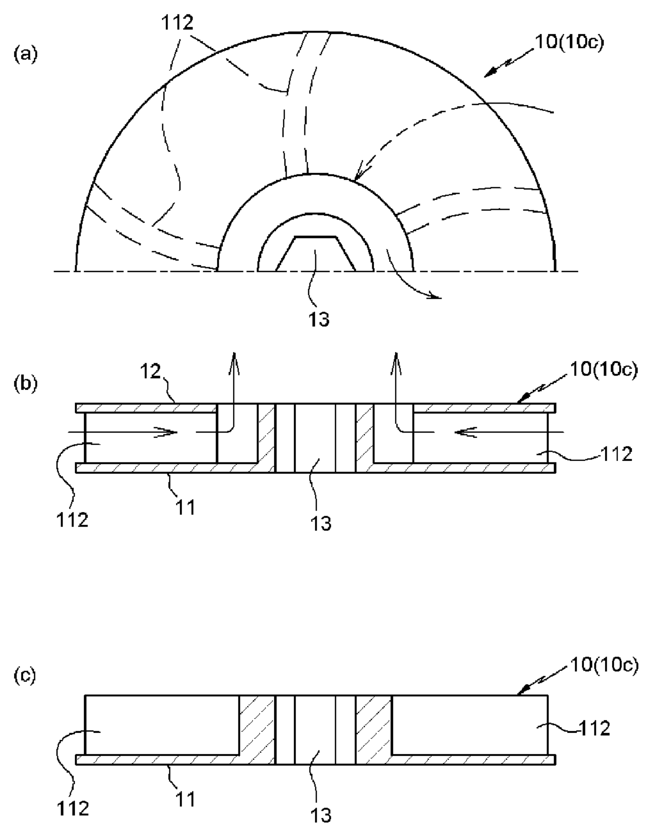
FIG. 18A is a partially omitted plan view of an impeller-type friction element according to an embodiment of the present disclosure.
FIG. 18B is a vertical cross-sectional view of FIG. 18A.
FIG. 18C is a vertical cross-sectional view of another embodiment corresponding to FIG. 18B.
Figure 19:
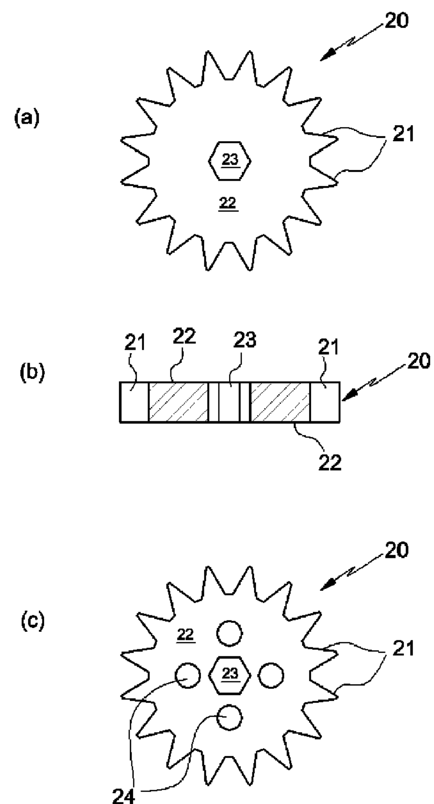
FIG. 19A is a plan view of a striker according to an embodiment of the present disclosure.
FIG. 19B is a vertical cross-sectional view of FIG. 19A.
FIG. 19C is a plan view of another example corresponding to FIG. 19A.

In addition, at least one of the friction elements 10 may be formed as an impeller-type friction element 10*c* having a plurality of vanes 112 (see FIGS. 18A to 18C).

The impeller-type friction element 10*c* may be formed in various shapes such as a shape in which vanes 112 are provided between opposite surfaces orthogonal to the axis of the body thereof (see FIGS. 18A and 18B), and a shape in which one side surface is opened to expose blades to one side (see FIG. 18C).

The impeller-type friction element 10*c* may increase a swirling flow rate, guide a fluid flow to the central portion so as to suppress the friction from being biased to the inner wall of the chamber, and increase the friction area.

Figure 20:
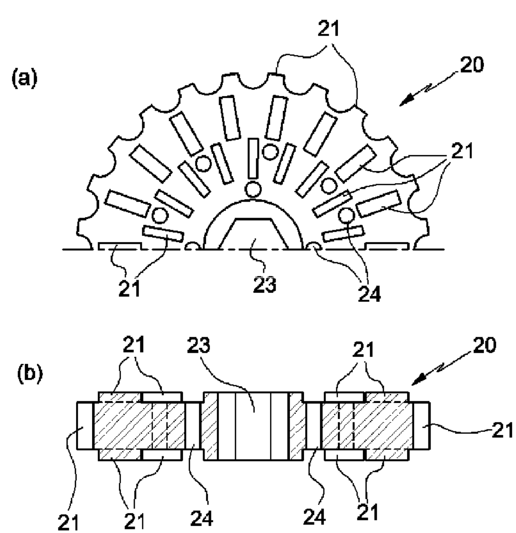
FIG. 20A is a partially omitted plan view of a striker according to an embodiment of the present disclosure.
FIG. 20B is a vertical cross-sectional view of FIG. 20A.

In addition, at least one of the strikers 20 of the first embodiment (1A), the second embodiment (1B), and the third embodiment (1C) may be provided with the protrusions 21 on at least one of the peripheral surface of the disk-shaped body and the both surfaces orthogonal to the axis (FIG. 20).

Figure 21:
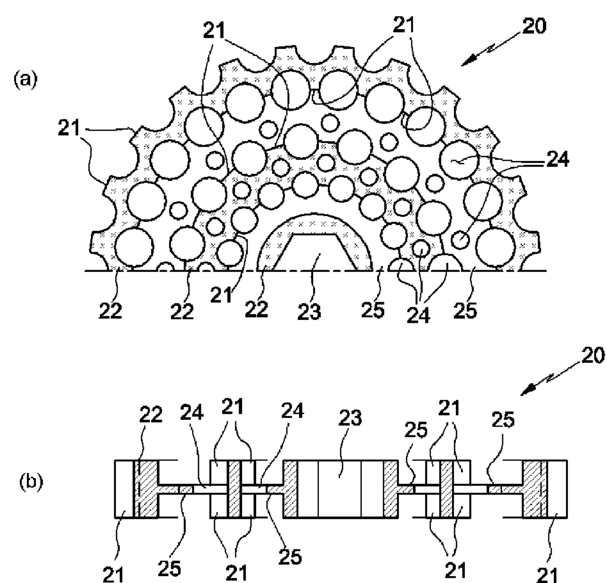
FIG. 21A is a partially omitted plan view of a striker according to an embodiment of the present disclosure.
FIG. 21B is a vertical cross-sectional view of FIG. 21A.

In addition, at least one of the strikers 20 may be provided with at least one concave stage 15 and a plurality of distribution holes on at least one of both surfaces of the disk-shaped body orthogonal to the axis thereof, and at least one of the outer periphery of the body and the inner or outer periphery of the concave stage 15 may be provided with the plurality of protrusions 21 (see FIG. 21).

Figure 22:
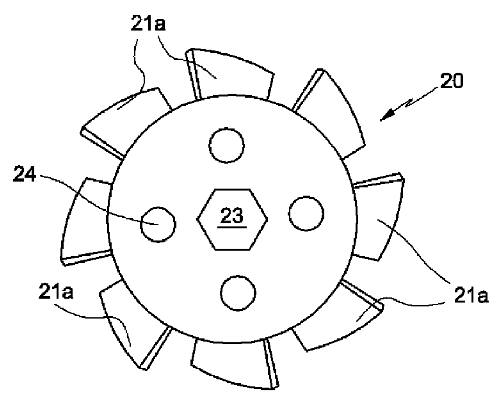
FIG. 22 is a plan view of a striker according to an embodiment of the present disclosure.

In at least one of the strikers 20, the protrusions may be configured as vane-shaped protrusions 21*a*, and by this configuration, it is possible to increase the flow rate along with the original function of the striker (see FIG. 22).

In addition, in the nanobubble generation apparatus 10A as well, as in the case of the second embodiment (2B), the friction elements 10 may be arranged on the driving shaft 41 to be spaced apart from each other at a predetermined interval, wherein one or more small-diameter friction elements 10S and one or more large-diameter friction elements 10L having a relatively large radius compared to the small-diameter friction elements 10S may be arranged at a predetermined interval in a mixed form.

In addition, one or more strikers 20 of the micro-level atomization apparatus 20A may be provided on the driving shaft 41 of the nanobubble generation apparatus 10A together with the one or more friction elements 10 (see FIG. 8).

As described above, when the striker 20 having the protrusions 21 around the body thereof is disposed in the nanobubble generation apparatus 10A, in particular, at the entrance of flow, the striker 20 applies an impact to the fluid and generates a strong centrifugal force to the fluid so that the frictional force can be strengthened by using the inner wall 33 of the first chamber.

Figure 23:
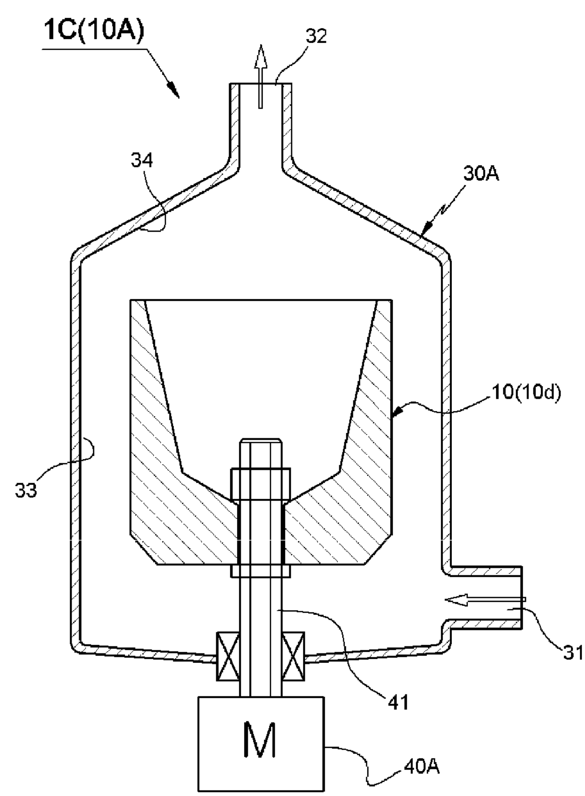
FIG. 23 is a vertical cross-sectional view of a nanobubble generation apparatus according to an embodiment of the present disclosure.

As an embodiment of the present disclosure, the friction element 10 installed in the first chamber 30A of the nanobubble generation apparatus 10A may be a single cylindrical friction element 10*d* having a cylindrical shape (see FIG. 23).

Figure 24:
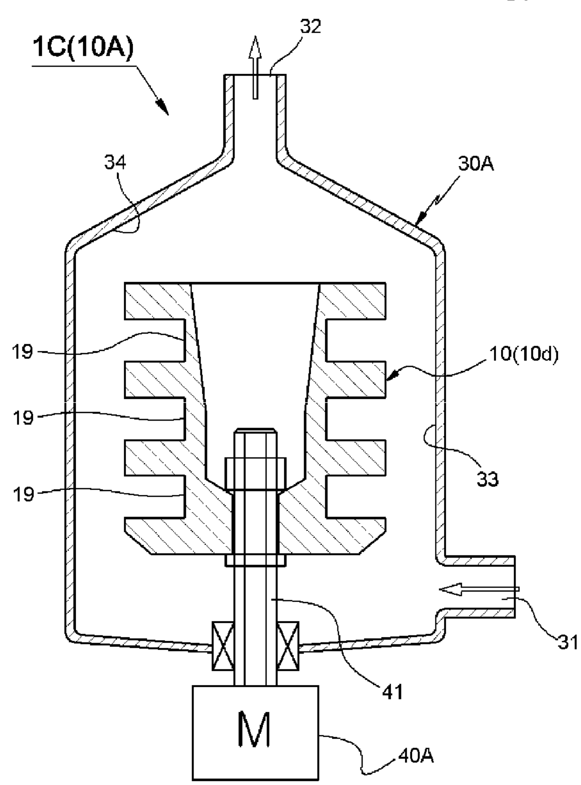
FIG. 24 is a vertical cross-sectional view of a nanobubble generation apparatus according to an embodiment of the present disclosure.
Figure 25:
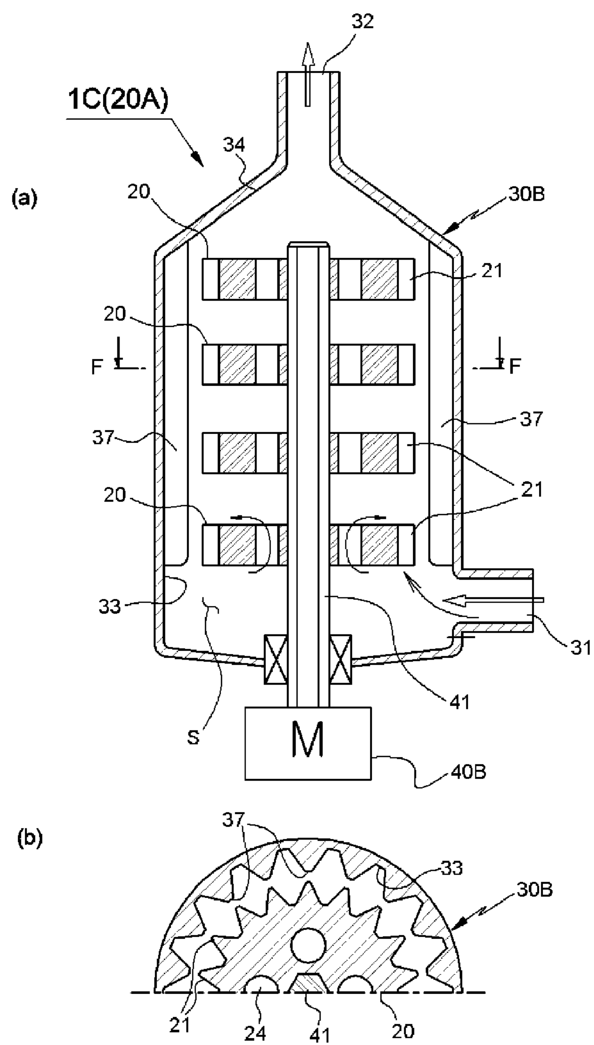
FIG. 25A is a vertical cross-sectional view of a micro-level atomization apparatus according to an embodiment of the present disclosure.
FIG. 25B is a partially omitted cross-sectional view taken along line F-F in FIG. 25A.
Figure 26:
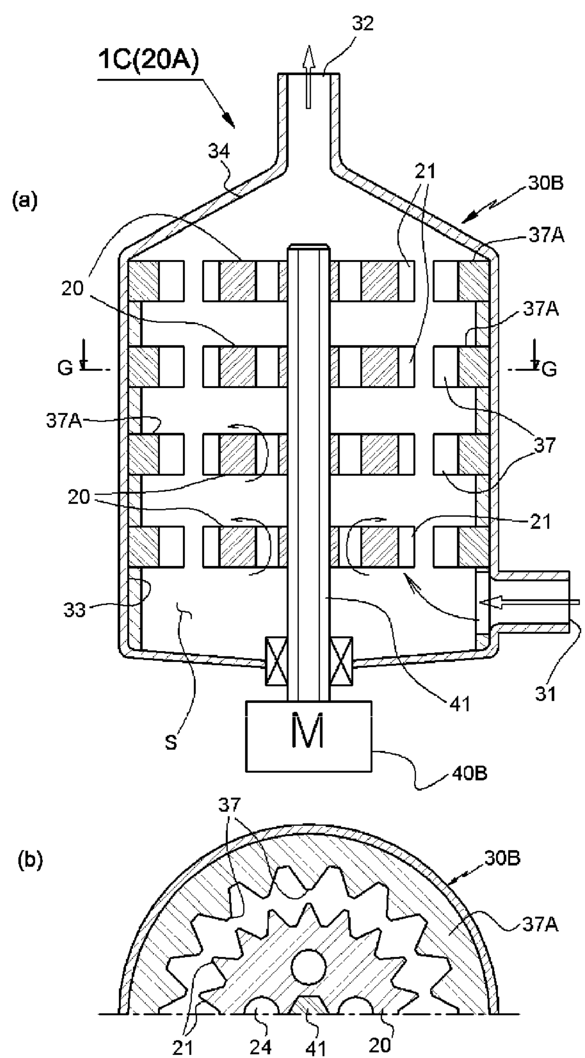
FIG. 26A is a vertical cross-sectional view of a micro-level atomization apparatus according to an embodiment of the present disclosure.
FIG. 26B is a partially omitted cross-sectional view taken along line G-G in FIG. 26A.
Figure 27:
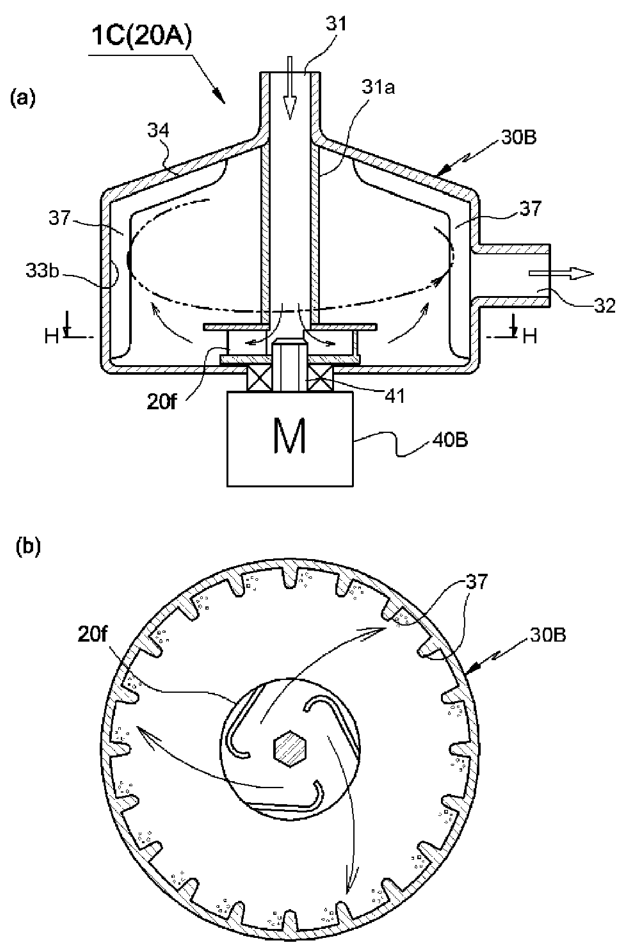
FIG. 27A is a vertical cross-sectional view of a micro-level atomization apparatus according to an embodiment of the present disclosure.
FIG. 27B is a partially omitted cross-sectional view taken along line H-H in FIG. 27A.

The cylindrical friction element 10*d* may include one or more concave stages 19 or one or more convex stages formed on the peripheral surface thereof in order to increase the friction area and induce a swirling flow of the gas-liquid mixed fluid (see FIG. 24).

The nanobubble generation apparatus 10A including the cylindrical friction element 10*d* has an advantage in that it is easy to manufacture the apparatus with a simple configuration in which the friction element is manufactured as a single body in the form of a cylinder, and is suitable for a small apparatus, but is not limited thereto.

In the micro-level atomization apparatus 20A, at least one of the strikers 20 may include the plurality of protrusions 21 formed at least around the periphery of the body, and the second chamber 30B may include a plurality of protrusions 37 formed directly or indirectly on at least a portion of the inner wall 33 (see FIGS. 25A to 26B).

When the protrusions 37 are formed on the inner wall of the chamber in the micro-level atomization apparatus 20A, the protrusions are capable of applying a strong impact and shear force to the fluid together with the protrusions 21 of the striker.

In addition, the micro-level atomization apparatus may a pump type micro-level atomization apparatus 20B in which the impeller 20*f* is provided on the driving shaft 41, the inlet of the impeller 20*f* is connected to the inlet of the chamber via an inlet pipe 31*a*, and protrusions 37 are radially formed on the inner wall 33 of the second chamber 30B (see FIGS. 27A and 27B and FIGS. 28A and 28B).

The protrusions 37 on the inner wall of the second chamber 30B may have a rib shape, but are not limited thereto.

In the pump-type micro-level atomization apparatus 20B, the fluid introduced through the impeller 20*f* collides with the inner wall 33 and the protrusions 37 of the second chamber, and at the same time, collision between the fluids occurs in the internal space of the second chamber and thus cavitation occurs. Accordingly, an impact and a shear force are applied to the fluid to generate microbubbles.

Figure 28:
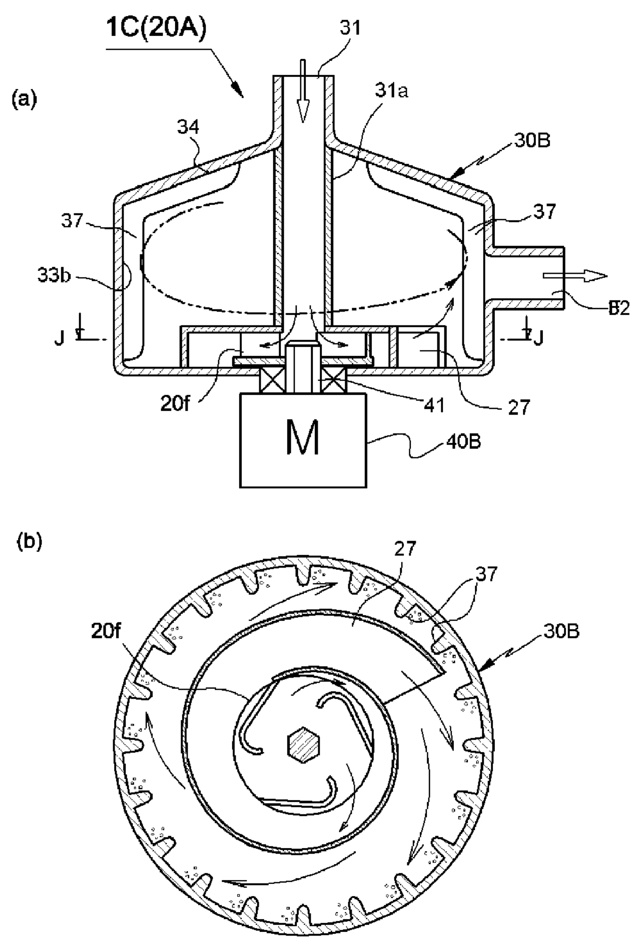
FIG. 28A is a vertical cross-sectional view of a micro-level atomization apparatus according to an embodiment of the present disclosure.
FIG. 28B is a partially omitted cross-sectional view taken along line J-J in FIG. 28A.

Between the impellers 20*f* of the pump-type micro-level atomization apparatus 20B and the inner wall 33 of the second chamber 30B, a volute-type duct that sucks and guides the gas-liquid mixed fluid to the inner wall 33 of the second chamber may be provided (see FIGS. 28A and 28B).

When the volute-type duct 27 is provided between the impeller 20*f* and the inner wall 33 of the second chamber 30B as described above, the fluid is collected and collide with the inner wall 33*b* and the protrusions 37 of the second chamber, whereby the impact and shear force can be strengthened and more powerful cavitation can be generated.

As illustrated in FIG. 6, the nanobubble generation system 1C of the third embodiment having the above-described configuration may be arranged in various ways.

As an embodiment, a pump P, one micro-level atomization apparatus 20A (20B), and one nanobubble generation apparatus 10A may be sequentially connected and provided in the flow line of the gas-liquid mixed fluid (see FIG. 6A).

In addition, a plurality of micro-level atomization apparatuses 20A (20B) may be provided in pairs with the pump P, and one nanobubble generation apparatus 10A may be connected after the plurality of micro-level atomization apparatuses 20A (20B) so that the fluid ejected from the plurality of micro-level atomization apparatuses 20A (20B) can be collected to and processed through the one nanobubble generation apparatus 10A (see FIG. 6B).

In addition, a pump P and a plurality of micro-level atomization apparatuses 20A (20B) may be provided in series in the flow line of the gas-liquid mixed fluid, and thereafter, the nanobubble generation apparatus 10A may be sequentially connected and installed (FIGS. 6C and 6D).

In addition, when a large amount of gas such as oxygen is injected at once in the flow line of the gas-liquid mixed fluid, an overflow phenomenon occurs due to temporary supersaturation of the gas.

In an embodiment of the present disclosure, gas injection may be performed at a plurality of locations in the fluid flow line, and thus, it is possible to enhance the nanobubble generation efficiency by causing the gas-liquid mixed fluid to contain a large amount of gas while preventing the overflow of the gas due to supersaturation (see FIG. 6C).

In addition, the pumps P involved in the above-described embodiments (see FIG. 6A to 6D) may be excluded (see FIG. 6E).

For example, when the micro-level atomization apparatus is of a pump type 20B or the striker includes vane type protrusions 21*a*, the pump P may be excluded.

As described above, in the nanobubble generation system 1C according to the third embodiment of the present disclosure, each of the micro-level atomization apparatus 20A (20B) and the nanobubble generation apparatus 10A includes a separate chamber and driving mechanism to be independently operated, whereby bubbles can be atomized stepwise so that nanobubbles can be efficiently and the driving load can be dispersed even in a large-capacity nanobubble generation system so that the nanobubble generation system can be operated without any difficulty.

Figure 29:
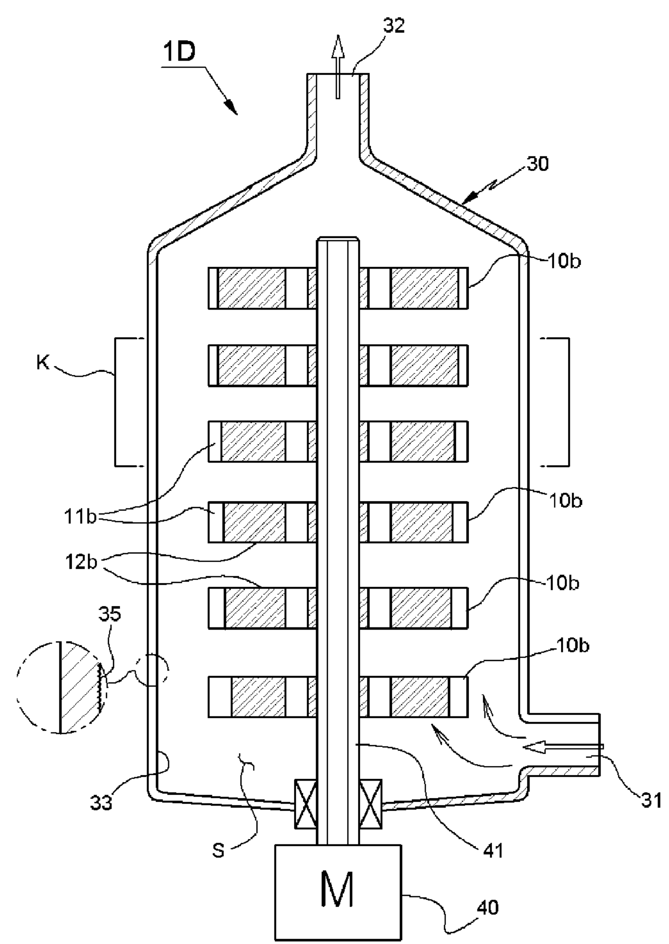
FIG. 29 is a vertical cross-sectional view illustrating the configuration of an embodiment of the present disclosure.
Figure 30:
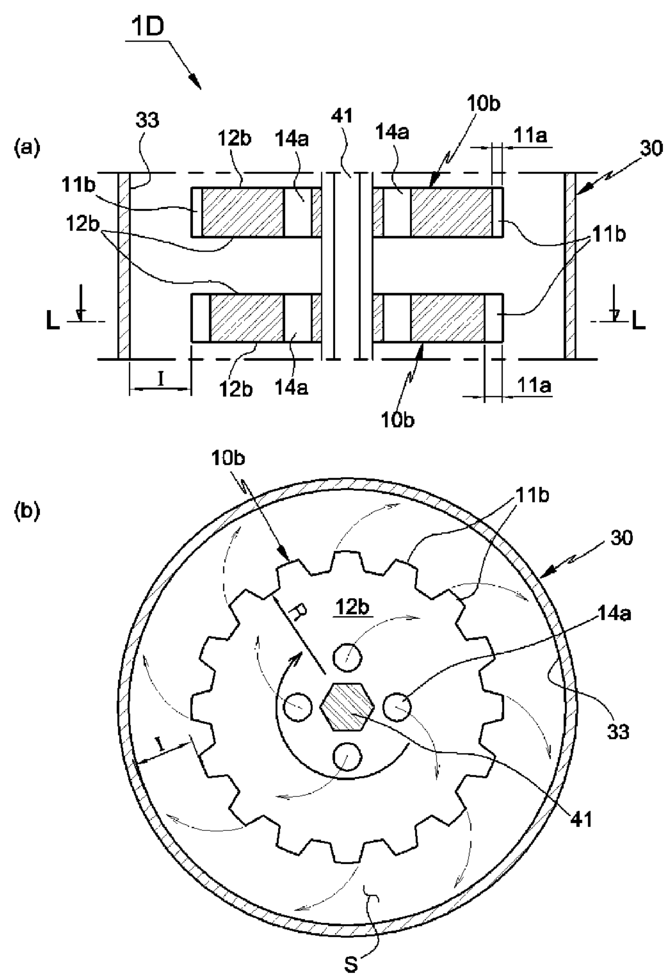
FIG. 30A is an enlarged view of part K in FIG. 29.
FIG. 30B is a cross-sectional view taken along line L-L in FIG. 30A.

As illustrated in FIGS. 29 to 33B, a nanobubble generation system 1D using friction according to a fourth embodiment of the present disclosure includes: a chamber 30 including an inlet 31, an outlet 32, and an internal space S configured to atomize bubbles included in a gas-liquid mixed fluid, the chamber 30 being provided with a driving shaft 41; one or more striking/friction elements 12*b* each including a plurality of protrusions 11*b* configured to apply impact to the gas-liquid mixed fluid introduced into the chamber 30 and swirl the fluid to rub against the inner wall 33 of the chamber, and a friction portion 12*b* be configured to apply a frictional force to the fluid, the striking/friction elements 10*b* being provided on the driving shaft 41; and a driving mechanism 40 including the driving shaft 41 and configured to rotate the striking/friction elements 10*b*, wherein the striking/friction elements 10*b* are arranged on the driving shaft 41 to be spaced apart from each other at a predetermined interval, and the peripheral surfaces of the bodies of the striking/friction elements directly face the inner wall 33 of the chamber with a predetermined distance I therebetween (see FIGS. 29 to 30B).

The friction portions 12*b* in the striking/friction element 10*b* are surfaces orthogonal to the axis of the striking/friction element, and as in the case of the above-described friction element, the fluid rubs against the friction portions when the striking/friction element rotates (see FIGS. 32A to 33B).

The striking/friction element 10*b* provides an impact and friction at the same time, and during rotation, the protrusions 11*b* formed on the body apply an impact and shear force to the bubbles included in the gas-liquid mixed fluid to atomize the bubbles into microbubbles, and the friction portion 12*b* applies a strong friction to the bubbles atomized into the microbubbles, whereby the microbubbles undergo tensile deformation and ultra-atomization again so that nanobubbles are generated.

During the rotation operation of the striking/friction element 10*b*, in particular, the protrusions 11*b* generate a centrifugal force to strongly push the fluid to the inner wall 33 of the chamber, so that while a frictional force is applied to the fluid by using the inner wall 33 of the chamber, the gas-liquid mixed fluid crosses the spaces between the striking/friction element 10*b* and the inner wall 33 of the chamber to generate a spirally flowing flow (see FIGS. 29 to 30B).

At least one of the striking/friction elements 10*b* may be provided with at least one of distribution holes 14*a* and cut-out passages 14*b* for guiding the flow of the gas-liquid mixed fluid to a plane perpendicular to the axis thereof (see FIGS. 32A to 33B).

In addition, a plurality of striking/friction elements 10*b* may be arranged on the driving shaft 41 to be spaced apart from each other at a predetermined interval, wherein the protruding sizes 11*a* of the protrusions 11*b* may be relatively gradually decreased according to the arrangement order thereof in the fluid flowing direction in order to sequentially atomize the bubbles included in the gas-liquid mixed fluid from the microbubble level to the nanobubble level (see FIGS. 29 to 30B).

Figure 31:
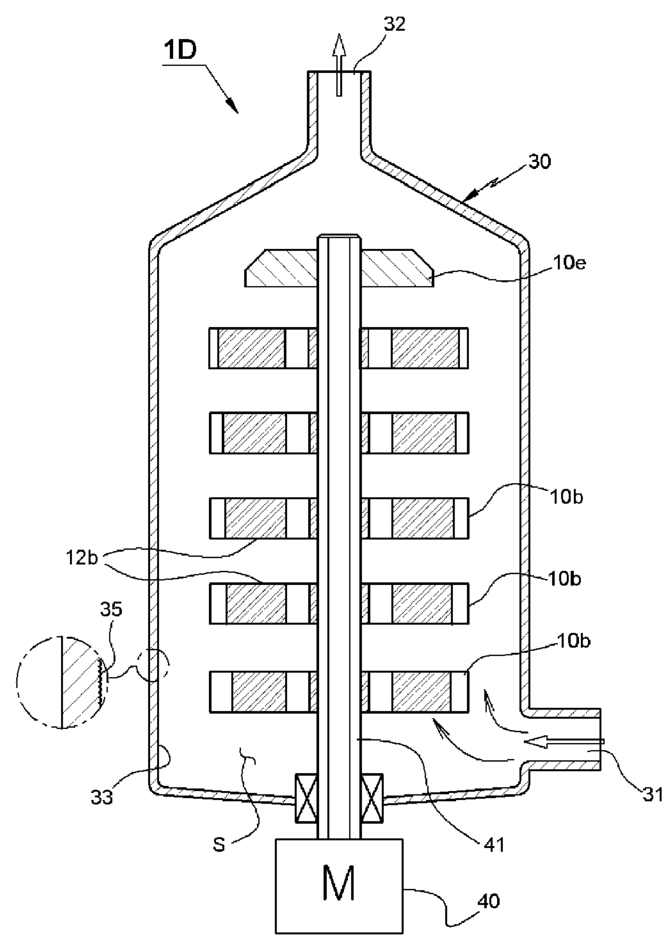
FIG. 31 is a vertical cross-sectional view illustrating the configuration of an embodiment of the present disclosure.
Figure 32:
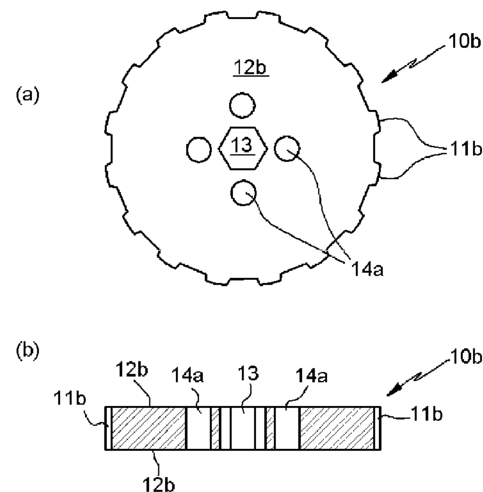
FIG. 32A is a plan view of a pump-type striking/friction element according to an embodiment of the present disclosure.
FIG. 32B is a vertical cross-sectional view of FIG. 32A.
Figure 33:
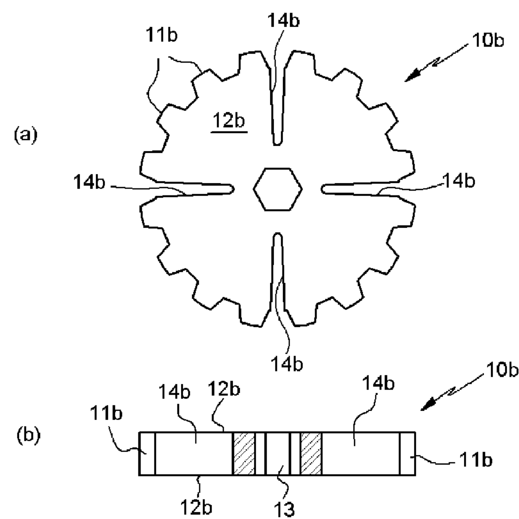
FIG. 33A is a plan view of a pump-type striking/friction element according to an embodiment of the present disclosure.
FIG. 33B is a vertical cross-sectional view of FIG. 33A.

The driving shaft of the fourth embodiment (1D) may be provided with the striking/friction elements 10*b*, while at least one friction element 10 may be provided at the rear portion of the driving shaft (see FIG. 31).

At least one of the striking/friction elements 10*b* may include the protrusions 11*b* formed on at least one of the peripheral surface of the body and both surfaces of the body orthogonal to the axis (not illustrated).

Preferably, the striking/friction element 10*b* also has a line speed of 8 m/sec or more, and the predetermined distance I from the inner wall 33 of the chamber is ½ or less of the radius of the striking/friction element.

The shaft holes 13 and 23 of the friction elements 10 and the strikers 20 may be formed in a polygonal shape or a keyway structure corresponding to the cross section of the driving shaft so that the friction elements and the strikes can be integrally rotated when the driving shaft 41 rotates (see FIG. 2, FIGS. 10A and 10B, FIGS. 21A and 21B, etc.).

Figure 34:
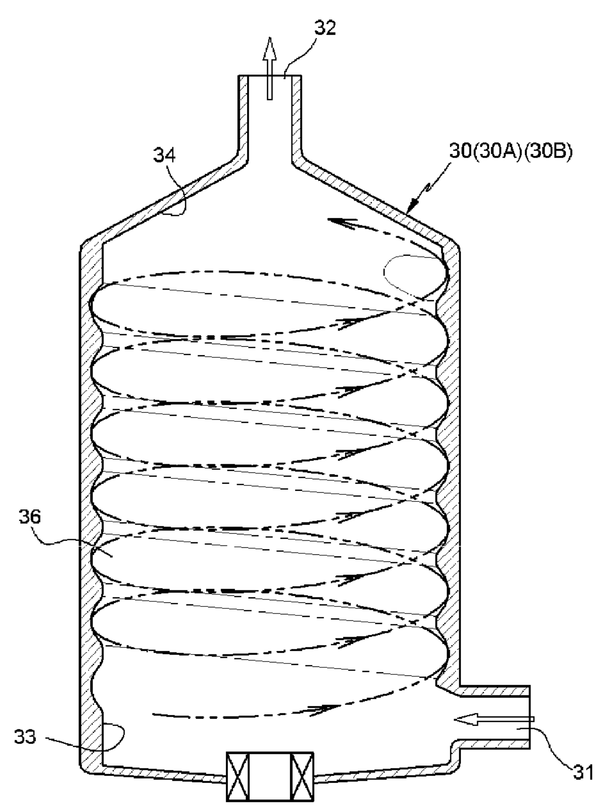
FIG. 34 is a vertical cross-sectional view of a chamber illustrating the configuration of an embodiment of the present disclosure.

Meanwhile, in one of the first to fourth embodiments (1A) to (1D), a spiral groove 36 for guiding a gas-liquid mixed fluid may be formed on the inner wall 33 of the chamber 30 (see FIG. 34).

In the case of the third embodiment (1C), the spiral groove 36 may be formed in both the first chamber 30A and the second chamber 30B.

The spiral groove 36 may be formed on a component separated from the body of the chamber 30, 30A, or 30B, and the component may be assembled to the body, and the spiral groove is capable of contributing to the increase of the friction area for the fluid while inducing a swirling flow of the fluid.

In addition, the chamber 30, 30A, or 30B may be provided with a funnel portion 34 at the side of the outlet 32, and the outlet 32 may be formed following the funnel portion 34 on an extension line of the center line of the driving shaft provided in the chamber (see FIG. 2, FIGS. 7A to 7C, FIG. 23, etc.).

In the chamber, since the funnel portion 34 and the outlet 32 are formed on the extension line of the center line of the driving shaft 41, the fluid swirling around the inner wall 33 of the chamber is smoothly ejected, and mass ejection can be performed smoothly even if the internal pressure of the chamber not is formed high.

In the chamber 30, 30A, or 30B, fine irregularities 35 may be formed on at least a portion of the inner wall 33 (see FIG. 2 and FIGS. 7A to 7C).

The fine irregularities 35 may be formed by scratches, sandblasted irregularities, or the like.

The fine irregularities 35 may be formed in the inflow region of the chamber, for example, as in the micro atomization region S1, to increase an impact and friction when the fluid collides therewith, but is not limited thereto.

Figure 35:
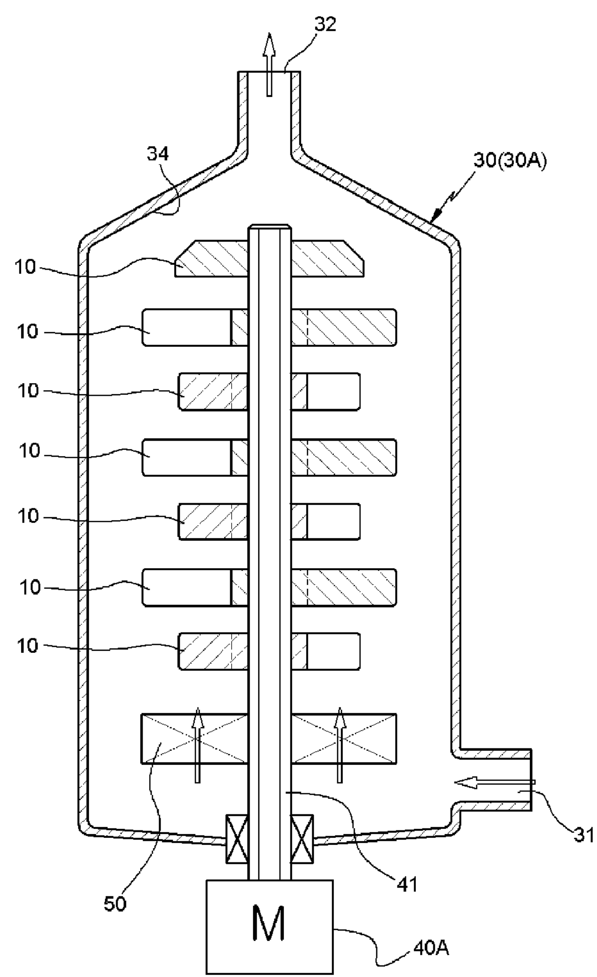
FIG. 35 is a vertical cross-sectional view illustrating the configuration of an embodiment of the present disclosure.

Meanwhile, the driving shaft 41 according to one of the first to fourth embodiment (1A) to (1D) of the present disclosure may be additionally provided with at least one impeller 50 adjacent to the inlet 31 of the chamber 30, 30A, or 30B (see FIG. 35).

When the impeller 50 is provided in the chamber 30 in this way, the gas-liquid mixed fluid may be introduced into the chamber by self-priming.

Meanwhile, the injected gas such as oxygen ($O_2$), ozone ($O_3$), or hydrogen ($H_2$) is not wholly dissolved in the liquid in the process of passing through the chamber 30, and a large amount (usually about 40%) of the gas is discharged in an undissolved state. Thus, after being discharged from the chamber, the gas scatters from the liquid and disappears into the air, causing a great loss.

Figure 36:
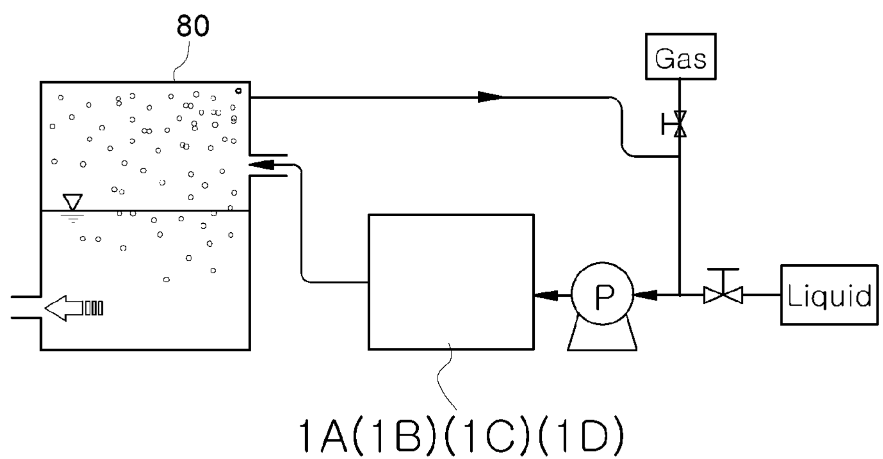
FIG. 36 is a schematic view illustrating an installed state of an embodiment of the present disclosure.

In order to prevent such a loss, a gas collection tank 80 for recovering and re-injecting the non-dissolved gas scattering from the gas-liquid mixed fluid may be provided and connected via a pipe (see FIG. 36).

The operating states of the nanobubble generation systems 1A, 1B, 1C, and 1D using friction and including the above-described configurations according to the first to fourth embodiments of the present disclosure will be reviewed with reference to Tables 1 and 2 below.

TABLE 1

| Experiment 1 | | | | | |
|---|---|---|---|---|---|
| Class. | Line speed of friction element (m/sec) | Increment of DO (ppm) | I | Chamber entrance pressure (bar) | Nanobubble generation (visually confirmed through transmission of green laser beam after microbubbles disappear) |
| Example 1 | 17.0 | 10.3 | 1/2R | 0.75-0.65 | Beam scattered light due to nanobubbles is visible |
| Example 2 | 14.1 | 11.6 | 1/2R | 0.75-0.65 | Beam scattered light due to nanobubbles is visible |
| Example 3 | 11.3 | 10.5 | 1/2R | 0.75-0.65 | Beam scattered light due to nanobubbles is visible |
| Example 4 | 8.5 | 9.3 | 1/2R | 0.75-0.65 | Beam scattered light due to nanobubbles is visible |
| Example 5 | 7.06 | 7.8 | 1/2R | 0.75-0.65 | Invisible |

TABLE 2

| Experiment 2 | | | | | |
|---|---|---|---|---|---|
| Class. | Line speed of friction element (m/sec) | Increment of DO (ppm) | I | Chamber entrance pressure (bar) | Nanobubble generation (visually confirmed through transmission of green laser beam after microbubbles disappear) |
| Example 1 | 17.4 | 18.9 | 12/100R | 0.9-0.8 | Beam scattered light due to nanobubbles is visible |
| Example 2 | 13.9 | 17.8 | 12/100R | 0.9-0.8 | Beam scattered light due to nanobubbles is visible |
| Example 3 | 10.45 | 16.5 | 12/100R | 0.9-0.8 | Beam scattered light due to nanobubbles is visible |

TABLE 2-continued

| Experiment 2 | | | | | |
|---|---|---|---|---|---|
| Class. | Line speed of friction element (m/sec) | Increment of DO (ppm) | I | Chamber entrance pressure (bar) | Nanobubble generation (visually confirmed through transmission of green laser beam after microbubbles disappear) |
| Example 4 | 8.7 | 15.8 | 12/100R | 0.9-0.8 | Beam scattered light due to nanobubbles is visible |
| Example 5 | 6.97 | 15.2 | 12/100R | 0.9-0.8 | Invisible |

From Tables 1 and 2 above, "I" denotes the distance between the tip-most end of the friction element 10 and the inner wall 33 of the chamber in the direction perpendicular to the axis, "R" denotes the radius of the friction element 10, and all experimental examples were each carried out under the following conditions.

1. Sample: tap water (DO: 8.5 ppm)
2. Experimental temperature: 24±0.5° C.
3. Injected gas and injection method: oxygen ($O_2$ 100%), self-priming
4. DO measurement time: 20 seconds after ejection in the nanobubble generation system
5. Nanobubble generation determination method: After the experiment was conducted, the sample was collected, shaken for 5 seconds, stopped for 3 minutes, and after the elapse of time for the microbubbles to disappear, a green laser beam (wavelength 532 nm) was transmitted in a dark room, and the determination was made through visual observation.

Unlike microbubbles that have a milky color in water, nanobubbles are transparent, so it is impossible to identify whether nanobubbles are generated under normal lighting conditions. Therefore, after the sample was collected in a transparent container, a green laser beam with a short wavelength was transmitted in a dark room.

At this time, when the nanobubbles float in the water, the laser beam is scattered to generate light, and when the nanobubbles do not exist, no light is generated.

When the green laser beam was transmitted through the sample subjected to the above-described experimental process, scattered light beams closely arranged in the form of bands was visible, so it was identified that nanobubbles were generated.

As shown in the experimental tables of Tables 1 and 2, it is identified that the amount of dissolved oxygen (DO) increases as the line speed of the friction element is faster, and it was identified that under the condition that the line speeds of the friction elements are the same, compared to the increments of DO in the examples of Experiment 1 in which the distance I was set to be narrower, the increments of DO are better in the examples of Experiment 2 in which the distance I between the tip-most end of the friction element in the axial direction and the inner wall of the first chamber was set to be wider.

In addition, the increase in DO was not necessarily proportional to the generation of nanobubbles.

It is determined that because the measurement of DO was made 20 seconds after ejection from the nanobubble generation apparatus was performed, the microbubbles, which disappear in 2 to 3 minutes after ejection, temporarily increased the level of DO.

The experimental results of the above examples are summarized below.

First, when the line speed of the friction element is at least 8 m/sec or more, microbubbles are rapidly ultra-atomized into ultra-fine nanobubbles.

In the examples in which the line speed of the friction element was reduced to 8 m/sec or less, it was identified that there was no significant nanobubble generation (Example 5 of Experiment 1 and Example 5 of Experiment 2) and that when the line speed increased to 8 m/sec or more, the generation of nanobubbles increased rapidly.

Setting the line speed of the friction element to 8 m/sec or more in various embodiments including the first embodiment (1A) is based on this empirical rule.

Second, it is preferable to configure the distance I between the inner wall 33 of the chamber and the tip end of the surface orthogonal to the axis of the friction element 10 to be close to ½ or less of the friction element radius R (I<½R) (see FIGS. 7B and 7C in comparison).

When the distance I between the tip end of the surface orthogonal to the axis of the friction element and the inner wall 33 of the chamber is set to be farther than ½ of the radius of the friction element (I>½R) as in the examples of Experiment 1 (see FIG. 7C), DO and nanobubble generation efficiency is markedly low compared to the case where the distance I is set as narrow as 12/100 of the radius R of the friction element 10 as in the examples of Experiment 2 (see FIG. 7B).

This phenomenon is caused because the centrifugal force and flow speed according to the rotation of the friction element 10 is gradually weakened before reaching the inner wall 33 of the chamber, so the frictional force using the inner wall of the chamber is weakened, and it can be seen that, when the distance I is set as narrow as ½ or less as in the examples of Experiment 2, the increase in DO and generation of nanobubbles are efficiently achieved.

In addition, the plurality of friction elements 10 are arranged to be spaced apart from each other so that when the driving shaft rotates, a flow in which the fluid spirally flows is generated (see FIGS. 4, 7A, and 8), and, as illustrated in FIG. 1B, the bubbles included in the gas-liquid mixed fluid undergo tensile deformation in an arc shape on the peripheral surface 11 and the both surfaces 12 of each rotating friction element 10 perpendicular to the axis, in particular, on the wide inner wall 33 of the first chamber 30 (30A) to be finely divided and intensively atomized so that nanobubbles are generated.

At this time, as described above, as necessary conditions for generating nanobubbles, a sufficient friction surface, a line speed of the friction elements 10 for inducing a flow rate, and an appropriate distance between the friction elements 10 and the inner wall 33 of the chamber should be organically satisfied.

In the foregoing, the inner wall 33 of the chamber directly facing the friction element 10 refers to a surface against which the fluid rubs by a centrifugal force when the friction elements 10 and the strikers are rotated, and is not limited to the inner wall of the chamber 30 itself and includes the inner wall of a separate component that is coupled to the inner wall of the chamber.

That is, the inner wall 33 of the chamber itself may be replaced by a separate component coupled to the inner wall of the chamber for any reason other than the inner wall of the chamber 30 itself.

In the foregoing, preferred embodiments of the present disclosure have been described with reference to the accompanying drawings.

Here, the terms or words used in the present specification and claims should not be construed as being limited to conventional or dictionary meanings, but should be interpreted as meanings and concepts consistent with the technical spirit of the present disclosure. In addition, it shall be noted that because the embodiments described in the specification and the configurations illustrated in the drawings are merely illustrative embodiments of the present disclosure, and do not represent all the technical ideas of the present disclosure, there may be various equivalents and modifications that may replace the embodiments at the time of filing the present application.

INDUSTRIAL APPLICABILITY

As it becomes possible to generate nanobubbles in a qualitatively and quantitatively favorable manner according to the present disclosure, nanobubbles excellent in utility can be easily used at a low cost, especially in the industrial field requiring a large amount of nanobubbles.

The invention claimed is:

1. A nanobubble generation system using friction, the nanobubble generation system comprising:

a chamber including an inlet, an outlet, and an internal space configured to atomize bubbles included in a gas-liquid mixed fluid, the chamber being provided with a driving shaft;

one or more strikers each including a plurality of protrusions provided on a body thereof to simultaneously apply impact to the gas-liquid mixed fluid that flows into the chamber and swirl the fluid in order to cause the gas-liquid mixed fluid to rub against an inner wall of the chamber, the strikers being provided on the driving shaft;

a plurality of friction elements provided on the driving shaft in order to apply frictional force to the gas-liquid mixed fluid; and a driving mechanism including the driving shaft and configured to rotate the strikers and the friction elements, wherein the friction elements are arranged on the driving shaft to be spaced apart from each other at a predetermined interval, and peripheral surfaces of bodies of the friction elements directly face the inner wall of the chamber with a predetermined distance therebetween, at least one of the friction elements has a line speed of 8 m/sec or more at a tip end of the body thereof in a direction orthogonal to the axis thereof, and the one or more strikers and at least one of the plurality of friction elements are provided with at least one of a distribution hole or a cut-out passage configured to guide a flow of the gas-liquid mixed fluid to a plane perpendicular to the axis thereof.

2. The nanobubble generation system of claim 1, wherein the driving shaft is sequentially provided with:

the driving shaft is sequentially provided with a micro-atomization region in which the one or more strikers are arranged along the flow direction of the fluid in order to atomize the bubbles included in the gas-liquid mixed flowing into the chamber to a microbubble level in advance; and a nano-atomization region that is provided after the micro-atomization region on the fluid flow and in which one or more friction elements are arranged in order to ultra-atomize the bubbles, which are atomized into a micro-level, into nanobubbles.

3. The nanobubble generation system of claim 2, wherein the micro-atomization region is provided with a ring-shaped stator on the inner wall of the chamber to face the strikers, and the stator is provided with a plurality of protrusion around a ring-shaped inner surface thereof.

4. The nanobubble generation system of claim 1, wherein at least one of the one or more friction elements is an impeller-type friction element including a plurality of vanes.

5. A nanobubble generation system using friction, the nanobubble generation system comprising:

a chamber including an inlet, an outlet, and an internal space configured to atomize bubbles included in a gas-liquid mixed fluid, the chamber being provided with a driving shaft;

one or more strikers each including a plurality of protrusions provided on a body thereof to simultaneously apply impact to the gas-liquid mixed fluid that flows into the chamber and swirl the fluid in order to cause the gas-liquid mixed fluid to rub against an inner wall of the chamber, the strikers being provided on the driving shaft;

a plurality of friction elements provided on the driving shaft in order to apply frictional force to the gas-liquid mixed fluid; and a driving mechanism including the driving shaft and configured to rotate the strikers and the friction elements, wherein the plurality of friction elements are arranged on the driving shaft to be spaced apart from each other at a predetermined interval, the peripheral surfaces of the bodies of the friction elements directly face the inner wall of the chamber with a predetermined distance therebetween, and one or more small-diameter friction elements and one or more large-diameter friction elements having a relatively large radius compared to the small-diameter friction elements are arranged to be spaced apart from each other at a predetermined interval.

6. The nanobubble generation system of claim 5, wherein the driving shaft is sequentially provided with:

a micro-atomization region in which the one or more strikers are arranged along the flow direction of the fluid in order to atomize the bubbles included in the gas-liquid mixed flowing into the chamber to a microbubble level in advance; and a nano-atomization region that is provided after the micro-atomization region on the fluid flow and in which one or more friction elements are arranged in order to ultra-atomize the bubbles, which are atomized into a micro-level, into nanobubbles.

7. The nanobubble generation system of claim 6, wherein the micro-atomization region is provided with a ring-shaped stator on the inner wall of the chamber to face the strikers, and the stator is provided with a plurality of protrusion around a ring-shaped inner surface thereof.

8. The nanobubble generation system of claim 5, wherein at least one of the one or more friction elements and the strikers is provided with at least one of a distribution hole and a cut-out passage configured to guide a flow of the gas-liquid mixed fluid to a plane perpendicular to the axis thereof.

9. The nanobubble generation system of claim 5, wherein at least one of the one or more friction elements is an impeller-type friction element including a plurality of vanes.

10. A nanobubble generation system using friction, the nanobubble generation system comprising:

one or more micro-level atomization apparatuses configured to apply an impact and a shear force to a gas-liquid fluid to atomize bubbles to a micro-level; and a nanobubble generation apparatus configured to apply a frictional force to the gas-liquid mixed fluid passing through the one or more micro-level atomization apparatuses to atomize the bubbles into nanobubbles, wherein the nanobubble generation apparatus includes:

a first chamber includes an inlet and an outlet for the fluid and an inner wall that defines a space configured to accommodate the gas-liquid mixed fluid and apply a frictional force to the fluid;

one or more friction elements provided in the first chamber to be rotatable by using a driving shaft and configured to function as a friction mechanism for the fluid that generate a centrifugal force to push the fluid to the inner wall; and a first driving mechanism including the driving shaft in order to rotate the friction elements, and wherein the micro-level atomization apparatus of the one or more micro-level atomization apparatuses includes:

a second chamber including an inlet, an outlet, and an internal space configured to atomize the bubbles included in the gas-liquid mixed fluid, the second chamber being provided with a driving shaft;

one or more strikers or impellers provided on the driving shaft and each including a plurality of protrusions configured to apply an impact to the fluid, and wherein the at least one of said one or more strikers is provided on the driving shaft of the nanobubble generation system together with the one or more friction elements; and a second driving mechanism including the driving shaft and configured to drive the strikers or the impellers.

11. The nanobubble generation system of claim 10, wherein at least one of the one or more friction elements and the strikers is provided with at least one of a distribution hole and a cut-out passage configured to guide a flow of the gas-liquid mixed fluid to a plane perpendicular to the axis thereof.

12. The nanobubble generation system of claim 10, wherein at least one of the one or more friction elements is an impeller-type friction element including a plurality of vanes.

13. The nanobubble generation system of claim 10, wherein, in the micro-level atomization apparatus of the one or more micro-level atomization apparatuses, at least one of the strikers is provided with a plurality of protrusions on at least the periphery of the body thereof, and the second chamber is provided with a plurality of protrusions directly or indirectly on at least a portion of an inner wall thereof.

14. The nanobubble generation system of claim 10, wherein the micro-level atomization apparatus, of the one or more micro-level atomization apparatuses, is provided with the impeller on the driving shaft, an inlet of the impeller is connected to the inlet of the chamber via an inlet pipe, and the micro-level atomization apparatus, of the one or more micro-level atomization apparatuses, is a pump-type micro-level atomization apparatus in which protrusions are radially formed on the inner wall of the second chamber.

15. The nanobubble generation system of claim 14, wherein, between the impeller of the pump-type micro-stage atomization apparatus and the inner wall of the second chamber, a duct containing a volute and configured to suck and guide the gas-liquid mixed fluid to the inner wall of the second chamber is provided.

* * * * *